United States Patent
Banuelos et al.

(10) Patent No.: US 10,941,535 B2
(45) Date of Patent: Mar. 9, 2021

(54) DEVICES FOR CONTROLLING EROSION AND STORM WATER RUNOFF

(71) Applicants: Juan Banuelos, Arcadia, CA (US); Hugh Ballantine, Whittier, CA (US)

(72) Inventors: Juan Banuelos, Arcadia, CA (US); Hugh Ballantine, Whittier, CA (US)

(*) Notice: Subject to any disclaimer, the term of this patent is extended or adjusted under 35 U.S.C. 154(b) by 45 days.

(21) Appl. No.: 16/127,070

(22) Filed: Sep. 10, 2018

(65) Prior Publication Data
US 2019/0078285 A1 Mar. 14, 2019

Related U.S. Application Data

(60) Provisional application No. 62/556,054, filed on Sep. 8, 2017.

(51) Int. Cl.
| | |
|---|---|
| *E03F 5/04* | (2006.01) |
| *E02D 17/20* | (2006.01) |
| *B01D 15/00* | (2006.01) |
| *C02F 1/28* | (2006.01) |
| *B32B 9/00* | (2006.01) |
| *B32B 9/04* | (2006.01) |
| *B32B 5/02* | (2006.01) |
| *E03F 1/00* | (2006.01) |
| *E02B 11/00* | (2006.01) |
| *C02F 103/00* | (2006.01) |
| *C02F 101/20* | (2006.01) |

(Continued)

(52) U.S. Cl.
CPC .............. *E02D 17/20* (2013.01); *B01D 15/00* (2013.01); *B32B 5/028* (2013.01); *B32B 9/007* (2013.01); *B32B 9/047* (2013.01); *C02F 1/283* (2013.01); *E02B 11/00* (2013.01); *E03F 1/00* (2013.01); *E03F 5/0403* (2013.01); *E03F 5/0404* (2013.01); *B32B 2307/724* (2013.01); *C02F 2101/20* (2013.01); *C02F 2101/306* (2013.01); *C02F 2101/32* (2013.01); *C02F 2103/001* (2013.01); *E02D 2300/00* (2013.01); *E02D 2300/009* (2013.01)

(58) Field of Classification Search
CPC ........ E03F 5/0404; E03F 5/06; B01D 24/042; B01D 39/08; C02F 1/283
USPC .................. 210/163, 164, 170.03, 747.3
See application file for complete search history.

(56) References Cited

U.S. PATENT DOCUMENTS

| | | | |
|---|---|---|---|
| 6,214,216 B1 * | 4/2001 | Isaacson ............... | E03F 5/0404 210/163 |
| 6,706,172 B2 * | 3/2004 | Strawser, Sr. ......... | E03F 5/0404 210/164 |

(Continued)

*Primary Examiner* — Christopher Upton
(74) *Attorney, Agent, or Firm* — Roland J. Tong; Manning & Kass, Ellrod, Ramirez, Trester LLP

(57) ABSTRACT

Stormwater runoff and erosion control devices include carpets or blankets, wattles, and compact drainage filters. A carpet or blanket is a sheet of mesh material having a border formed of a different material than the mesh material. Wattles and compact drainage filters include mesh material supported by a rigid frame. In preferred embodiments, the mesh material includes biochar or activated carbon. Blankets and carpets may be positioned above or suspended below drainage grates in a storm water runoff system, and held in place by magnets. Wattles may be placed on hillsides, or between concrete barriers and drainage grates. Compact drainage filters may be placed at the outlets of catchment basins.

9 Claims, 24 Drawing Sheets

(51) Int. Cl.
*C02F 101/32* (2006.01)
*C02F 101/30* (2006.01)

(56) References Cited

U.S. PATENT DOCUMENTS

| | | | |
|---|---|---|---|
| 6,908,549 B2* | 6/2005 | Middleton | E03F 5/0404 |
| | | | 210/164 |
| 7,005,060 B2* | 2/2006 | Pitt | E03F 5/0404 |
| | | | 210/163 |
| 7,544,016 B2* | 6/2009 | McGinn | E02B 3/04 |
| | | | 210/170.03 |
| 7,837,869 B2* | 11/2010 | Peters, Jr. | E03F 5/0404 |
| | | | 210/164 |
| 8,221,632 B2* | 7/2012 | McInnis | E03F 5/0404 |
| | | | 210/164 |
| 2002/0130070 A1* | 9/2002 | Roesner | E03F 5/0404 |
| | | | 210/163 |
| 2008/0179229 A1* | 7/2008 | Dorsey | E03F 5/0404 |
| | | | 210/163 |
| 2017/0254063 A1* | 9/2017 | Zock | E03F 5/0404 |
| 2018/0230688 A1* | 8/2018 | Morris | E03F 5/06 |

* cited by examiner

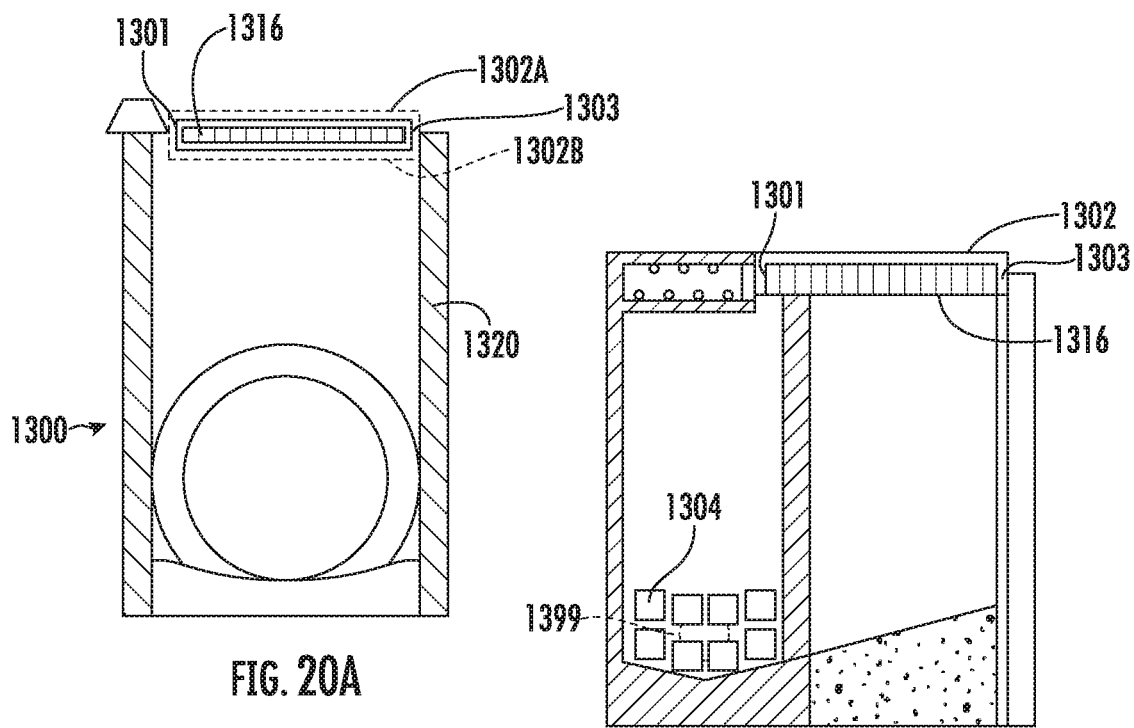
FIG. 20A
FIG. 20B
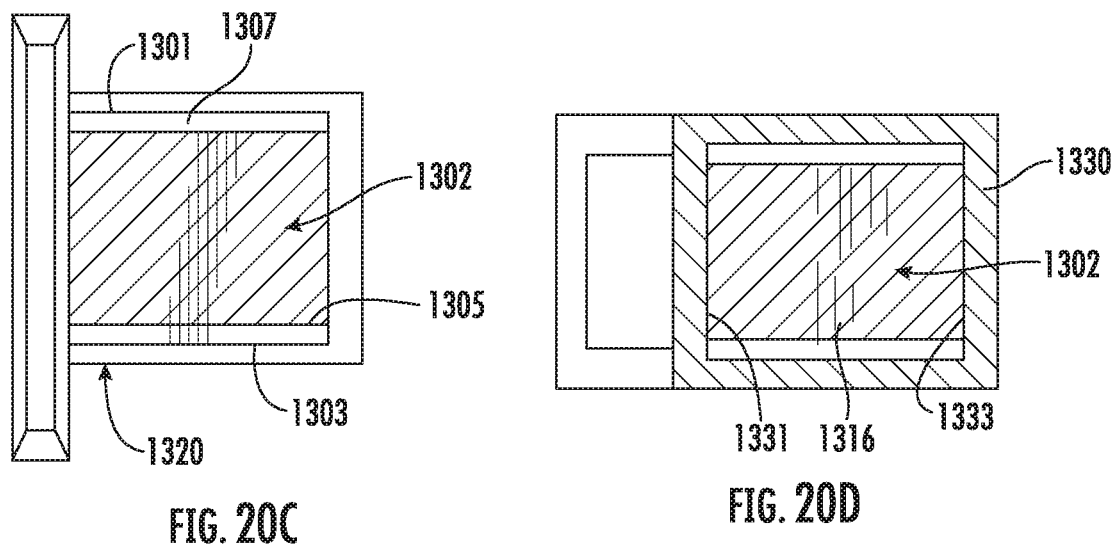
FIG. 20C
FIG. 20D

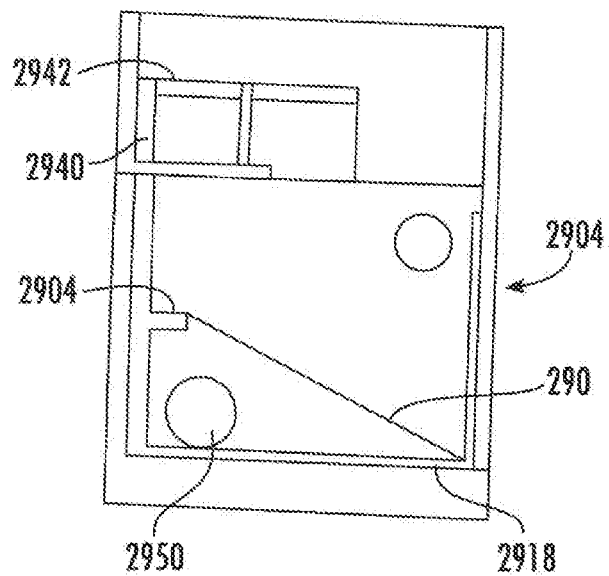
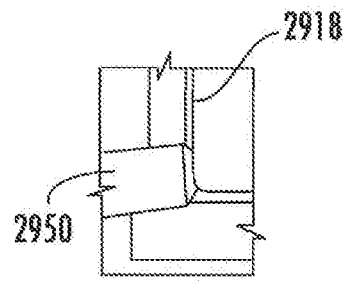
FIG. 29A
FIG. 29B
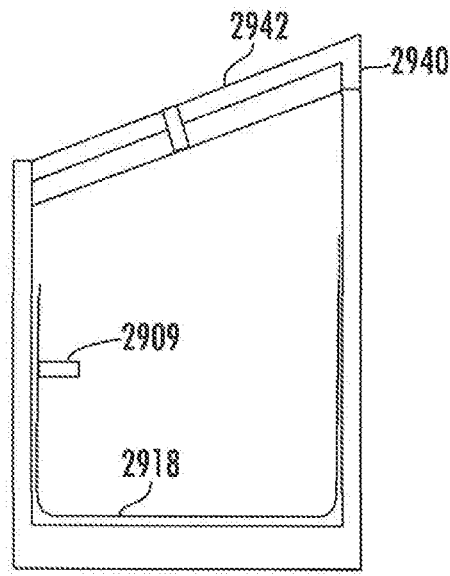
FIG. 29C

DEVICES FOR CONTROLLING EROSION AND STORM WATER RUNOFF

CROSS-REFERENCE TO RELATED TO APPLICATIONS

This application claims the benefit of U.S. Provisional Application No. 62/556,054 filed on Sep. 8, 2017.

TECHNICAL FIELD

The present disclosure relates in general to devices for controlling erosion and storm water runoff and, more particularly, to wattles and drain inlet filters.

BACKGROUND

Heavy rains present a multitude of challenges to environmentalists, civil engineers, builders, and farmers, among others. One of those challenges is soil erosion, which results in the loss of nutrient-rich topsoil, decreasing the fertility of the environment and destabilizing hillsides. Another challenge is storm water runoff, which picks up pollutants such as bacteria, oil and grease, trash, and pesticides, from paved surfaces and ultimately deposits these pollutants into local waterways. These challenges are not new—human beings have been trying to control erosion and storm water runoff for centuries—but climate change and overpopulation have made the need for solutions more urgent than ever.

In the construction industry, soil erosion and storm water runoff are often controlled through the use of fiber rolls or wattles—elongated tubes filled with straw, rice, coconut fiber, or the like, that are placed along the contours of hillsides or at drain inlets to intercept runoff and reduce the velocity of flow. Water passes through the tubes, but sediment is left behind, reducing the loss of topsoil, and preventing some contaminants from reaching the watershed. Alternatively, the same materials found in wattles can be woven into long, flat mats known as erosion control blankets, and spread out over large surfaces. Both wattles and erosion control blankets can be effective for short-term use, but the conventional filling materials deteriorate with time, making them unsuitable for permanent erosion control.

Storm water runoff is also controlled through a variety of Best Management Practices including the use of retaining walls, bioswales, concrete barriers, gross solids removal devices (GSRDs), filtering vaults, gabions, and drainage inlet filters. There is room for improvement in all these practices.

SUMMARY

Storm water runoff and erosion control devices according to the present disclosure comprise various configurations for positioning filtration material in the path of flowing surface water. In the most preferred configurations, the filtration material comprises biochar or activated carbon.

In one embodiment of the invention, a storm water runoff control device is configured as a blanket or carpet comprising a sheet of mesh material having a border. The carpet may be flat, and may be supported above the grate of a drainage inlet. Alternatively, the carpet may be suspended below the grate of a drainage inlet, forming a concave sieve or a rectangular basket that extends downwardly into a drain. The carpet may be supported above or suspended below the grate by an attachment assembly that includes a magnet. A variety of other arrangements for incorporating the device within a preexisting storm water management system are also disclosed.

In other embodiments of the invention, a storm water runoff and erosion control device comprises a rigid frame covered by a layer of mesh material. The frame, which may be constructed from a plurality of tubular elements such as polyvinylchloride (PVC) pipes, defines an interior space that is filled with filtration material. In one embodiment, the device is configured as a wattle having an elongated frame with a triangular cross-section. The wattle may be extended along the contour of a hill to reduce erosion, or it may be placed at the entrance to a drainage inlet to slow the velocity of, and filter sediment and contaminants from, water entering the inlet. In another embodiment, the device is a compact filter that may be configured as a cube, cylinder, sphere, or other suitable geometry. A plurality of these compact filters may be placed in the basin of a storm water drain, and piled sufficiently high to cover the outlet from the basin. Thus, all the water in the basin must pass through the compact filters before exiting.

BRIEF DESCRIPTION OF THE DRAWINGS

FIG. 20A is a side elevation of a catch basin fitted with stormwater runoff control devices according to the present disclosure.

FIG. 20B is a front elevation of FIG. 20A FIG. 20C is a front elevation of FIG. 20A.

FIG. 20C is a plan view of FIG. 20A

FIG. 20D is a plan view of FIG. 20B.

DETAILED DESCRIPTION

Figure 1:
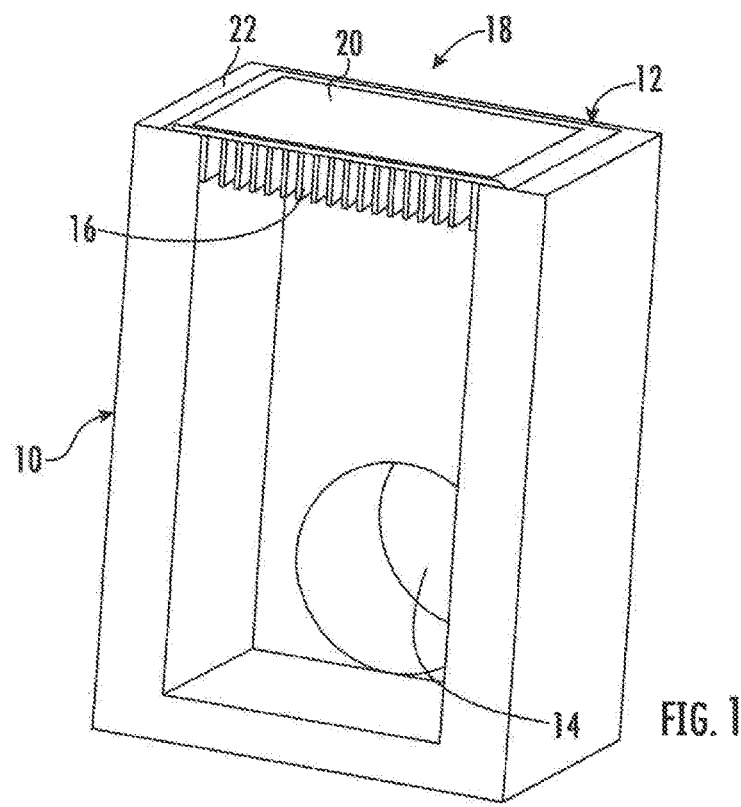
FIG. 1 is an isometric view showing a storm water runoff control carpet according to the present disclosure, positioned above the grate of a drain inlet.
Figure 2:
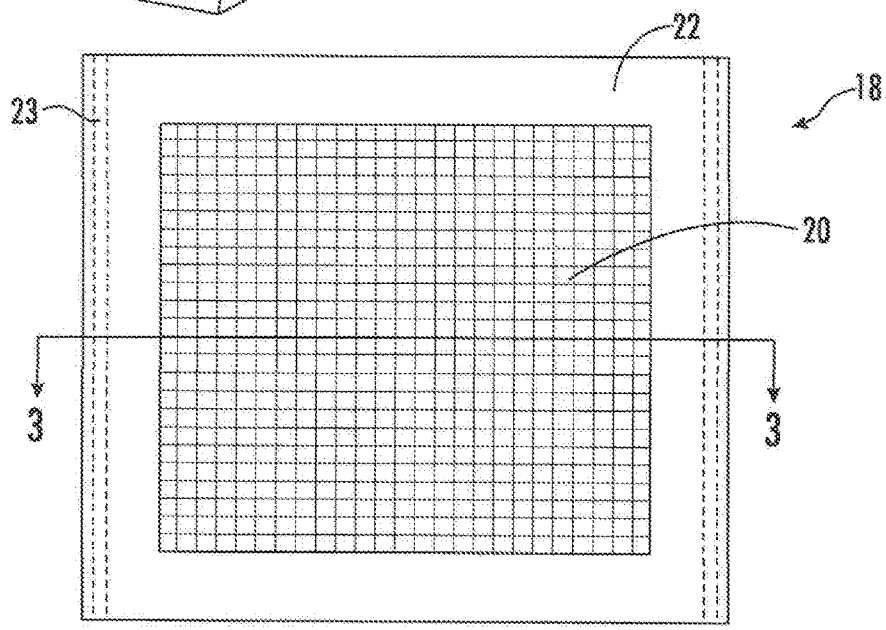
FIG. 2 is a plan view of the storm water runoff control carpet of FIG. 1.
Figure 3:
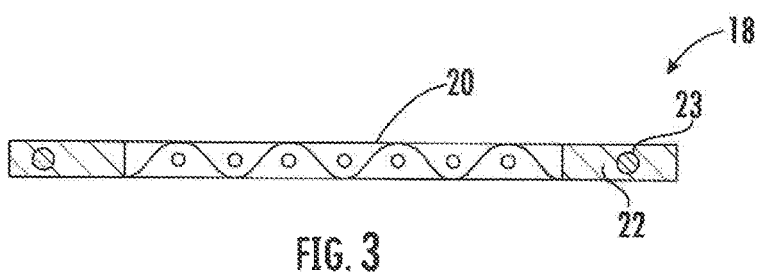
FIG. 3 is a sectional view taken through line 3-3 of FIG. 2.

FIG. 1 shows a storm drain frame 10 including an inlet 12 and an outlet 14. The inlet 12 is covered by a metal grate 16 which in turn is covered by a storm water runoff control carpet 18 according to a first embodiment of the present disclosure. In this embodiment, shown in greater detail in FIGS. 2 and 3, the storm water runoff control carpet 18 includes a fabric mesh portion 20 surrounded along its perimeter by a border portion 22. The mesh portion 20 may be made of any woven or non-woven fabric capable of filtering out very fine particles, but is preferably a non-woven geotextile made of propylene fibers. Drain and filter geotextile fabrics suitable for this purpose are commercially available from Christy's Inc. of Anaheim, Calif. The border portion 22 may be made of a woven or non-woven fabric different from the material used in the mesh portion, or from a non-fabric material such as rubber, polymers, wood, metal, or composites thereof. The border portion 22 may be attached to the mesh portion 20 by mechanical fasteners such as screws, bolts, clips, staples, hook- and loop type fasteners such as Velcro®, or by water-resistant adhesives such as epoxy or double-sided tape, and combinations thereof. Metal bars or rods 23 may be provided in pockets along the edges of the border portion 23.

The shape of the storm water runoff control carpet 18 preferably matches the shape of the grate 16 over which it is placed. For instance, in the illustrated embodiment, the carpet 18 is rectangular to match the rectangular grate 16. For circular drains with circular grates, the carpet 18 could be circular. The mesh portion 20 of the carpet 18 is preferably the same size as, or slightly smaller than, the grate 16, while the border portion 22 extends outwardly beyond the outer limits of the grate, forming an enlarged rim that assists in keeping the carpet 18 in place. In some embodiments, the border portion 22 may not entirely surround the mesh portion 20, but may extend along a single edge, or two or three edges, as needed. Furthermore, in some embodiments, the outer edges of the border portion 22 may lie directly over the outer edges of the mesh portion 20, rather than extending beyond them as illustrated.

Figure 4:
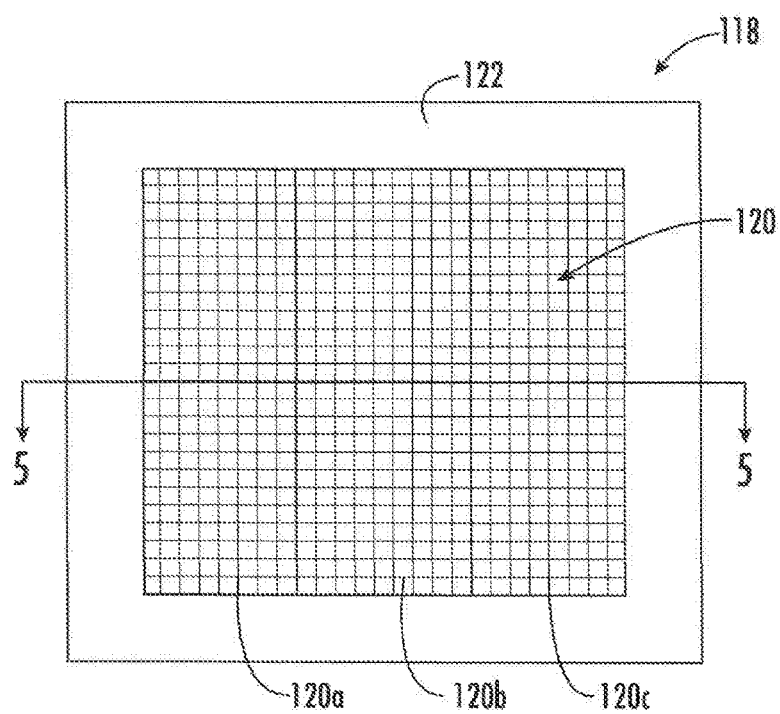
FIG. 4 is a plan view of a storm water runoff control carpet according to an alternate embodiment of the disclosure.
Figure 5:
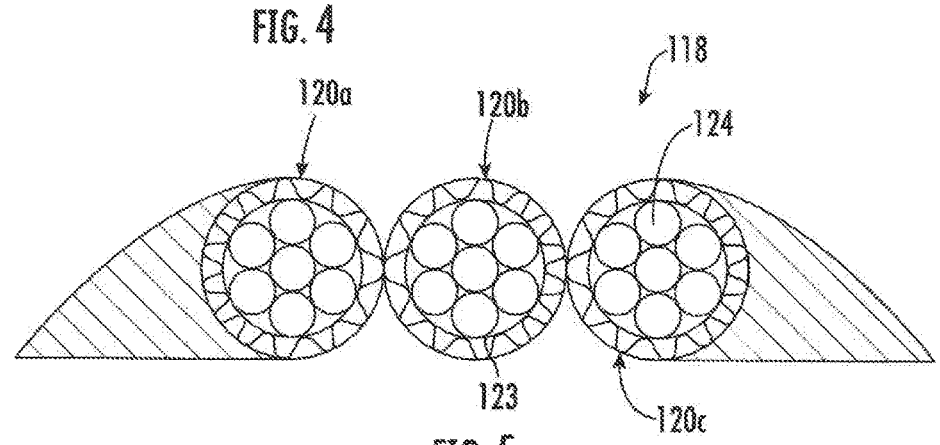
FIG. 5 is a sectional view taken through line 5-5 of FIG. 4.

In a storm water runoff control carpet 118 according to an alternate embodiment of the invention, illustrated in FIGS. 4 and 5, the mesh portion 120 comprises a plurality of mesh-covered cells 120a, b, c. Each cell 120a, b, c includes a mesh outer covering 123 formed of a woven or non-woven fabric and a filling 124 made of biomass material capable of filtering out contaminants such as bacteria, heavy metals, oil, grease, herbicides, and pesticides that pass through the outer covering 123. The biomass material preferably comprises activated carbon, which is charcoal that has been processed to have small, low-volume pores, or biochar, which is charcoal that has been produced from plant material via pyrolysis. In addition to its high porosity and surface area, which make it extremely effective at adsorbing contaminants, biochar is beneficial to the environment since it acts as a carbon sink. It is also very economical, since it can be made from products that otherwise would be wasted.

Figure 6:
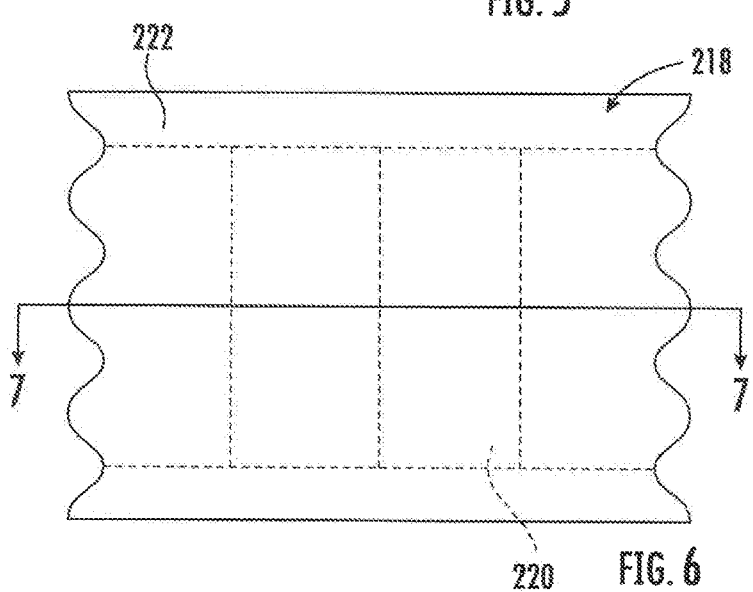
FIG. 6 is a plan view of a storm water runoff control blanket according to the present disclosure, with the internal filtration cells shown in phantom.
Figure 7:
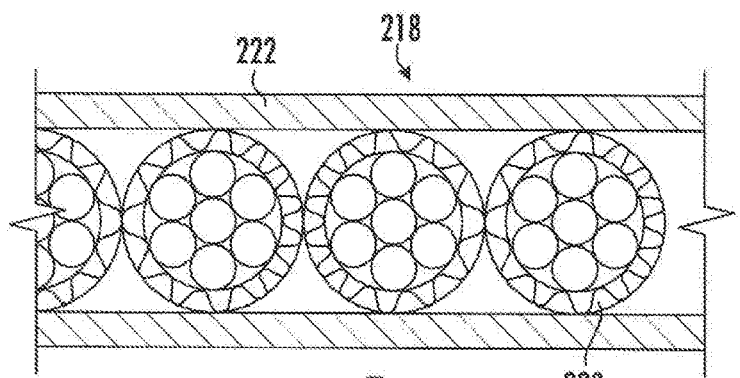
FIG. 7 is a sectional view taken through line 7-7 of FIG. 6.

A storm water runoff control blanket 218 according to the present disclosure is illustrated in FIGS. 6 and 7. The storm water runoff control blanket 218 is similar in form and function to the storm water control carpets of FIGS. 1-5, but is greatly elongated so that it can cover greater surface areas. The mesh portion 220 may consist of a single layer of mesh material, as in the embodiment of FIGS. 2 and 3, or it may comprise a plurality of mesh-covered cells, as in the embodiment of FIGS. 4 and 5. The border portion 222 may extend around the perimeter of the mesh portion 220 as in the embodiments of FIGS. 1-5, or it may cover the mesh portion 220, as shown in FIGS. 6 and 7. The embodiment of FIGS. 6 and 7 is particularly useful when the carpet is placed on a street or other location where it is likely to be driven over, since the border 222 protects the mesh portion 220 from being damaged by vehicles.

Figure 8:
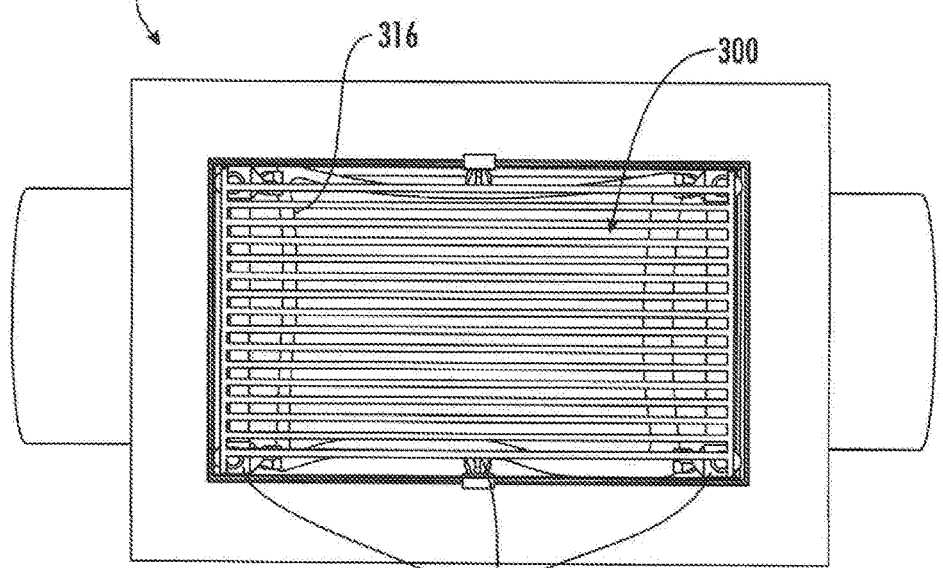
FIG. 8 is a perspective view from the top, showing a storm water runoff control sieve according to the present disclosure, positioned beneath the grate of a drain inlet.
Figure 9:
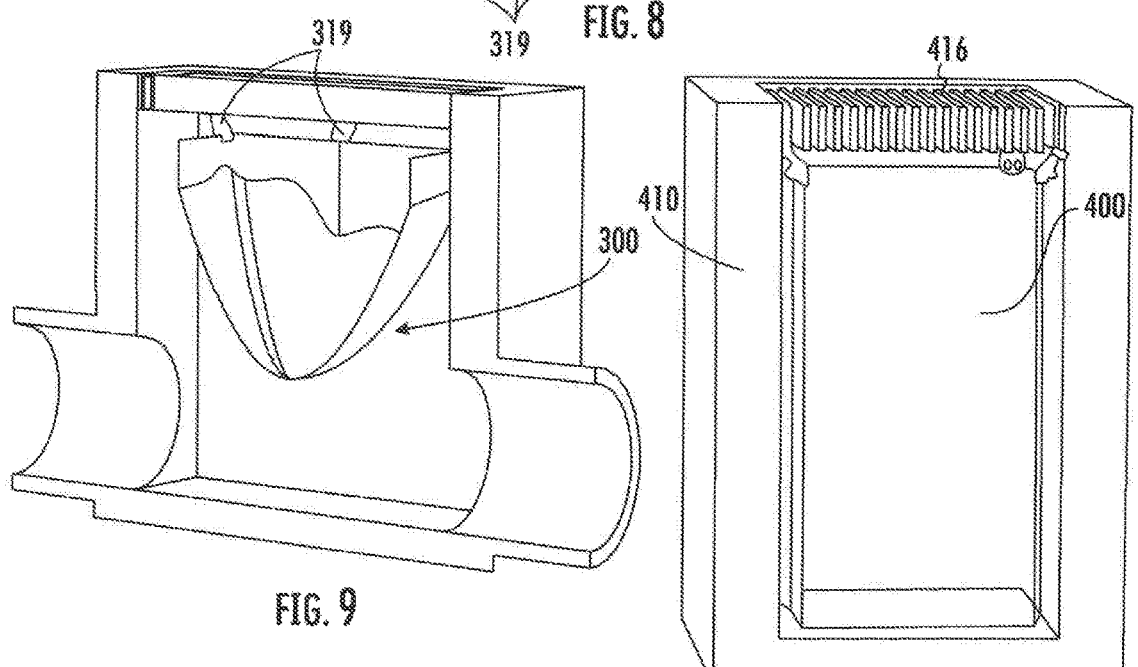
FIG. 9 is a sectional view taken through line 9-9 of FIG. 8.

FIGS. 8 and 9 show a storm water runoff control sieve 300 according to the present disclosure. The sieve 300 comprises a sheet, or multiple sheets, of woven or non-woven fabric mesh material that has been formed into a concave shape and suspended below the grate 316 of a storm drain frame 310. The sieve 300 is secured to the grate 316 by a set of metallic attachment clips 319. The sieve 300, which functions as a gross solids removal device, may or may not include a border portion similar to the carpets and blankets in the embodiments of FIGS. 1-7, and it may or may not include a layer of filtration material similar to the carpets and blankets in the embodiments of FIGS. 4-7. When enhanced with a filtration material such as biochar or activated carbon, the sieve 300 may be used for runoff mitigation. Without biochar or activated carbon, the sieve 300 can function essentially as a trash bag for collecting silt, debris, and other materials, and can easily be removed, disposed of, and replaced when full.

Figure 10:
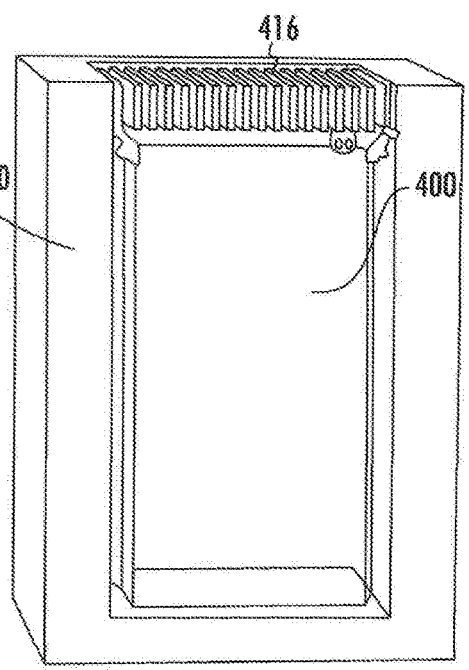
FIG. 10 is a sectional view, similar to FIG. 8, of a storm water runoff control basket according the present disclosure.

FIG. 10 shows a storm water runoff control basket 400. The basket 400 comprises a sheet, or multiple sheets, of woven or non-woven fabric mesh material that has been formed into a box-like shape and suspended below the grate 416 of a storm drain frame 410. Other than its shape, it is similar in form and function to the storm water runoff control sieve 300 of FIG. 9.

Figure 11A:
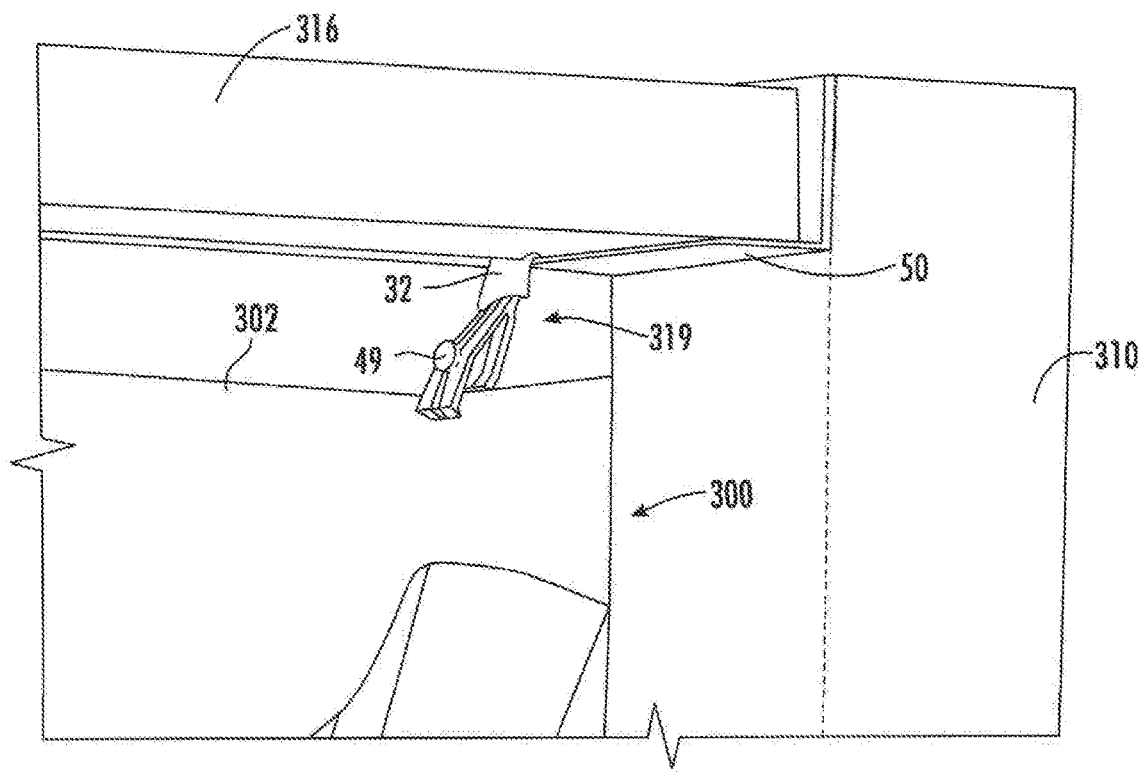
FIG. 11A is an enlarged detail of FIG. 9, showing an arrangement for attaching the sieve to the drain inlet.
Figure 11B:
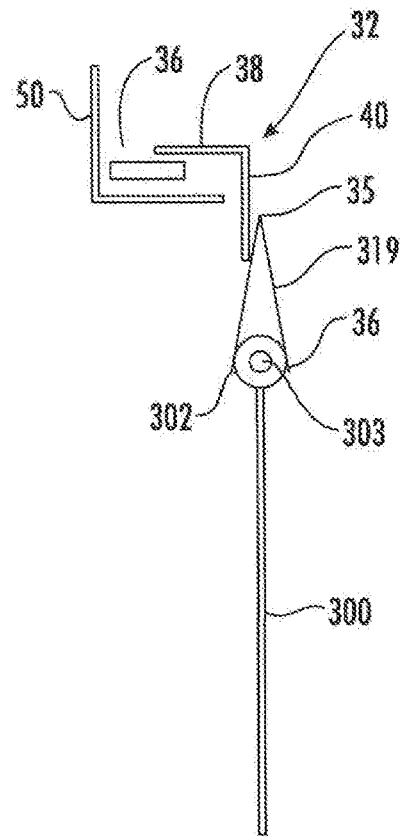
FIG. 11B is a schematic elevation of the attachment arrangement of FIG. 11A.

FIG. 11A is an enlarged detail of the upper edge of the sieve 300 of FIG. 9, illustrating how the attachment clip 319 secures the sieve 300 to a metallic grate support flange 50 projecting horizontally inwardly from the frame 310 of a drain inlet. As shown schematically in FIG. 11B, the clip 319 may, for instance, be a tarp clip having a hinged end 35 and a grasping end 36. The grasping end 36 grips the upper edge 302 of the sieve 300, and the hinged end 35 is coupled to a metallic angle bracket 32 that includes a horizontal portion 38 and a vertical portion 40. The horizontal portion 38 is preferably removably secured to the grate support flange 50 by a magnet 36, and the vertical portion 40 may be secured to the hinged end of the tarp clip 34 by any conventional fastener such as a screw. For additional strength and security, the upper edge 302 of the sieve 300 may be reinforced with an internal metal rod or bar 303, similar to the metal rod or bar 23 in the border of the water runoff control blanket of FIG. 2. The rod or bar 303 may be adjustable in length, to allow the filtration device to expand/or collapse as needed when being inserted into drainage inlets of different sizes.

Figure 12A:
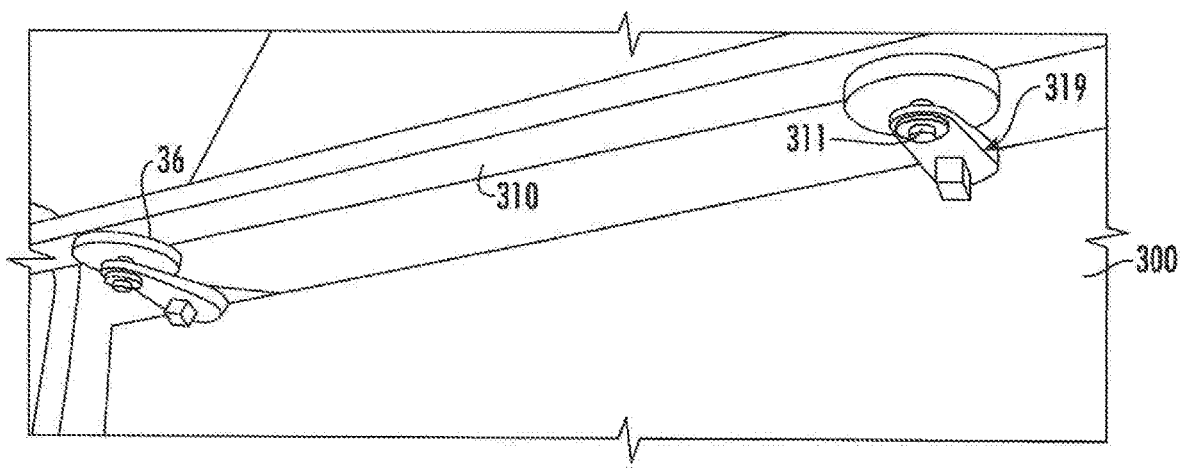
FIG. 12A is a perspective view showing an alternate arrangement for attaching a filtration device to a drain inlet.
Figure 12B:
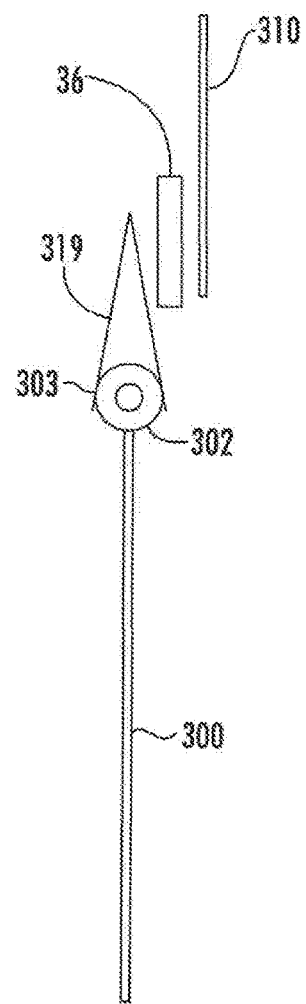
FIG. 12B is a schematic elevation of the attachment arrangement of FIG. 12A.

FIG. 12A is an enlarged detail illustrating an alternate way that the attachment clip 319 may be used to secure the sieve 300 or other filtration device to the drain inlet. In this arrangement, the drain inlet does not include a horizontally projecting grate support flange, but does have a vertical component 310 such as a wall formed of steel or other metal. As in the embodiment of FIGS. 1A and B, the clip may be a tarp clip 34 having a hinged end 35 and a grasping end 36, where the grasping end 36 grips the upper edge 302 of the filtration device 300. However, in this embodiment, the angle bracket is eliminated, and the hinged end 35 of the clip 34 is coupled to the magnet 36 by a screw 31 or other conventional fastener. The magnet 36 is magnetically coupled to the steel wall 310.

The fastening arrangements shown in FIGS. 11A,B and 12A,B are not meant to be limiting, but are merely examples of a multitude of ways that filtration devices may be secured to a drainage inlet or outlet. The use of magnets and clips in these arrangements is particularly advantageous because it allows a filtration device to be quickly and easily suspended underneath a drainage grate, and just as easily removed and replaced when needed. In addition, the magnets will attach to virtually any metallic component of a drain inlet or outlet, including the frame, the grate, or any fixture attached to the drain, regardless of whether the component or fixture is vertical, horizontal, or any other orientation. This allows the attachment arrangement to be customized to best suit the characteristics of the drain inlet or outlet, and to allow the filtration device to stay as close as possible to the outer wall of the inlet or outlet frame, thereby offering maximum protection and providing maximum surface area for capturing debris and surface runoff.

Figure 13:
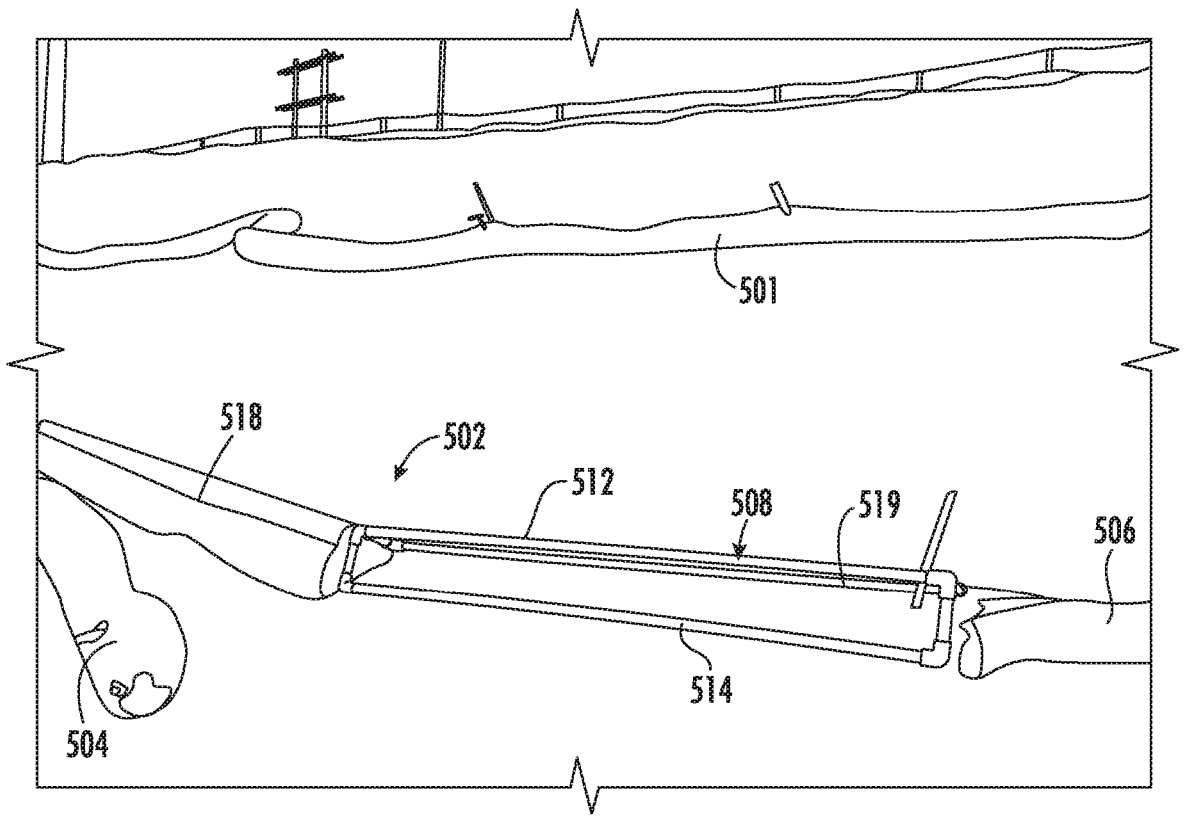
FIG. 13 is a perspective view of an erosion control wattle according to the present disclosure, with the frame separated from its mesh covering for purposes of illustration.
Figure 14:
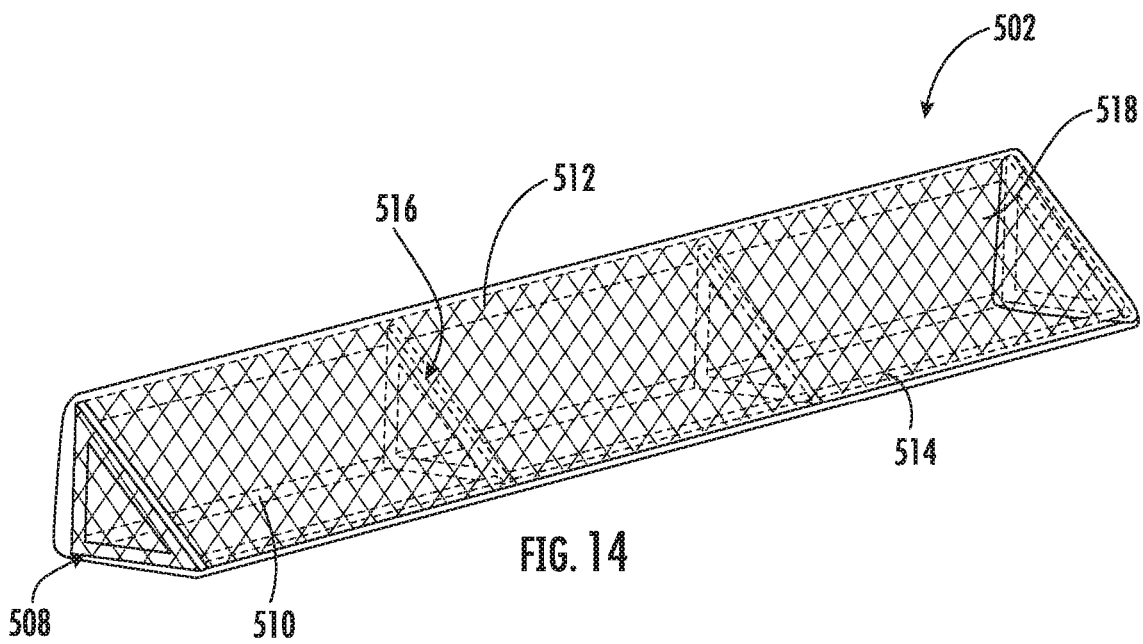
FIG. 14 is fragmentary perspective view of an erosion control wattle according to the present disclosure, with the inner frame shown in phantom.

FIG. 13 shows a hillside on which several conventional wattles 500 have been placed to slow down erosion. A triangular wattle 502 according to the present disclosure is being set up to replace a wattle that has deteriorated, leaving two halves 504, 506, with a large gap in between. The triangular wattle comprises a triangular frame 508 and a mesh covering 518, which has been separated from the frame 508 for purposes of illustration. The frame 508 is made of elongated tubular members 510, 512, 514, which may be made from a plastic material such as polyvinyl chloride (PVC), or from metal, or other suitable materials. As shown in FIG. 14, the triangular frame 508 is configured as a right triangle. If necessary, a plurality of triangular reinforcing members 516 may extend between the tubular members 510, 512, 514 at regular intervals along the length of the frame 508 to increase the strength and stability of the wattle 502. The triangular reinforcing members 516 may be constructed from tubes of the same material as the tubular members 510, 512, 514.

Figure 15A:
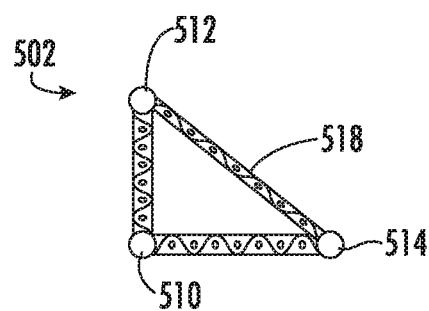
FIGS. 15A-D are sectional views taken through various embodiments of an erosion control wattle according to the present disclosure.
Figure 15B:
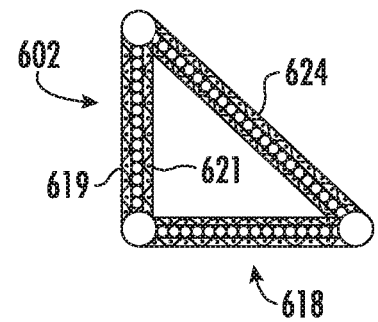
Figure 15C:
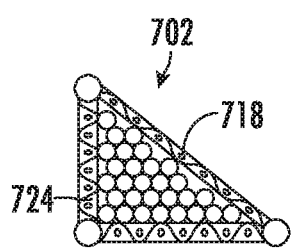
Figure 15D:
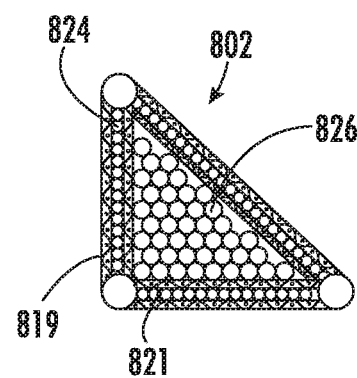

The mesh material 518 covering the frame 508 may be similar to the mesh material used in the erosion and storm water control devices of FIGS. 1-10. In one embodiment, shown in FIG. 15A, the mesh material 518 comprises a single layer of woven or non-woven fabric, and the interior of the wattle 502 is empty. In another embodiment, shown in FIG. 15B, the interior of the wattle 602 is again empty, but the mesh material 618 comprises two layers 619, 621 of with a layer of woven or non-woven fabric, with a layer of filtration material such as biochar or activated carbon 624 between the fabric layers 619 and 621. In yet another embodiment, shown in FIG. 15C, the mesh material 718 comprises a single layer of woven or non-woven fabric, and the interior of the wattle 702 is filled with filtration material such as biochar or activated carbon 724. In still another embodiment, shown in FIG. 15D, the mesh material 818 comprises two layers 819, 821 of with a layer of woven or non-woven fabric, with a layer of filtration material such as biochar or activated carbon 824 between the fabric layers 819 and 821. The interior of the wattle 802 is filled with more filtration material 826.

Figure 16:
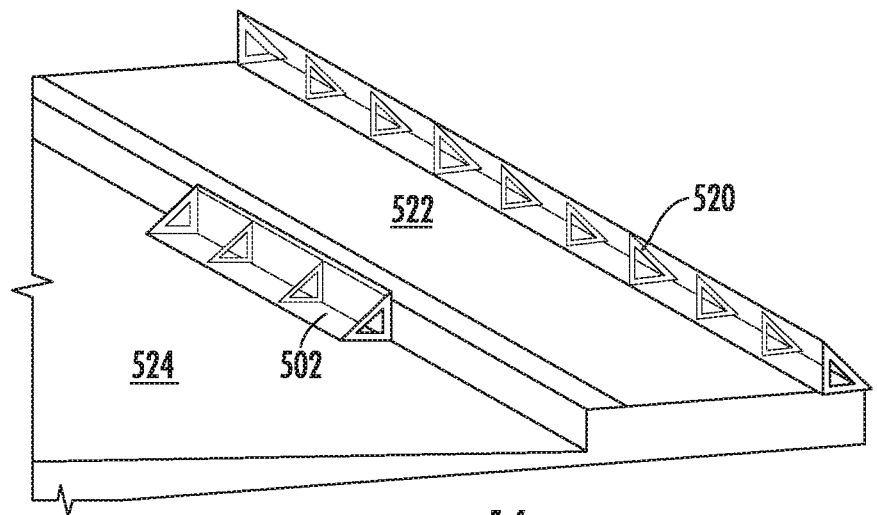
FIG. 16 is a perspective view showing erosion control wattles according to the present disclosure, placed along the edges of a curb or sidewalk.

FIG. 16 shows wattles 502, 520 according to the present disclosure being used to control runoff around a sidewalk 522. The first wattle 502 has been placed in front of a culvert in the sidewalk 522, with one short leg of the triangular frame resting against the edge of the sidewalk 522, the other short leg of the triangular frame resting against the street 524, and the hypotenuse of the triangular frame facing outwardly toward the street. Orienting the wattle 502 in this way ensures that the portion with the largest surface area faces the street, thus maximizing the amount of water that can be filtered before passing into the culvert.

The second wattle 520 is elongated (or alternatively, several wattles 520 may be placed end-to-end) to extend along substantially the full length of the sidewalk, and the orientation of this wattle is reversed relative to the first wattle 502, so that the hypotenuse of the triangular frame faces away from the street. This configuration is useful if the sidewalk is located next to a hill, since it slows or prevents water from running down the hill and onto the sidewalk.

Figure 17:
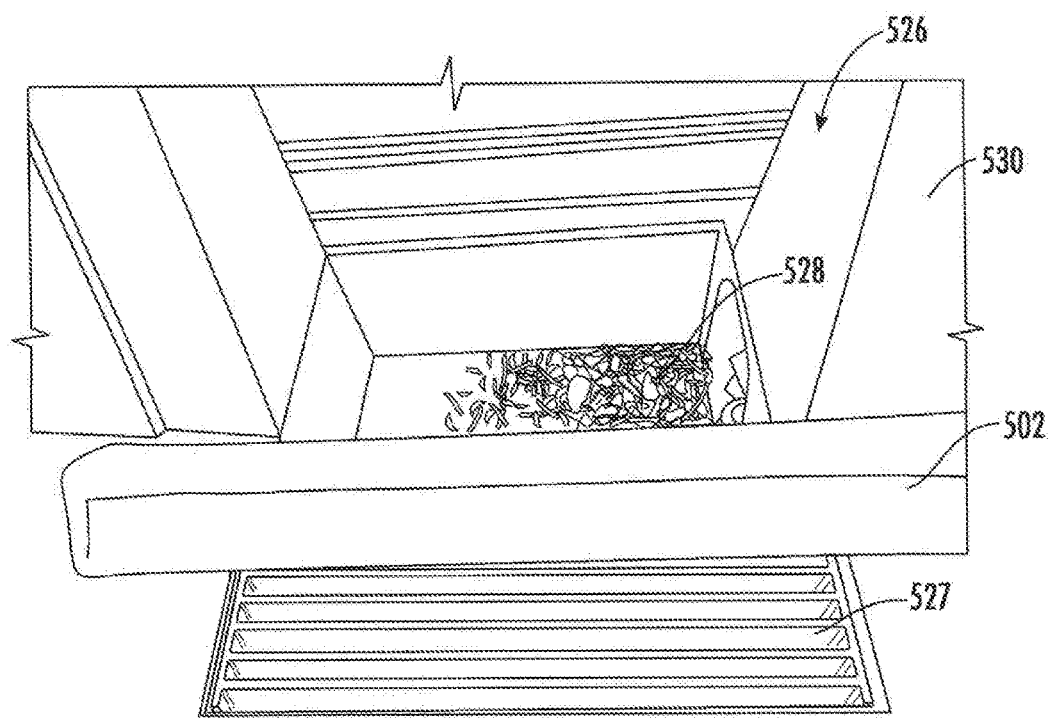
FIG. 17 is a perspective view showing a wattle according to the present disclosure, placed at the inlet of storm drain.

FIG. 17 shows a wattle 502 according to the present disclosure, placed between a storm drain 526 and a drainage basin 526 at the base of a concrete barrier 530. The purpose of the wattle 502 is to filter contaminants from any water that overflows from the drainage basin 526 before it enters the storm drain 526.

Figure 18:
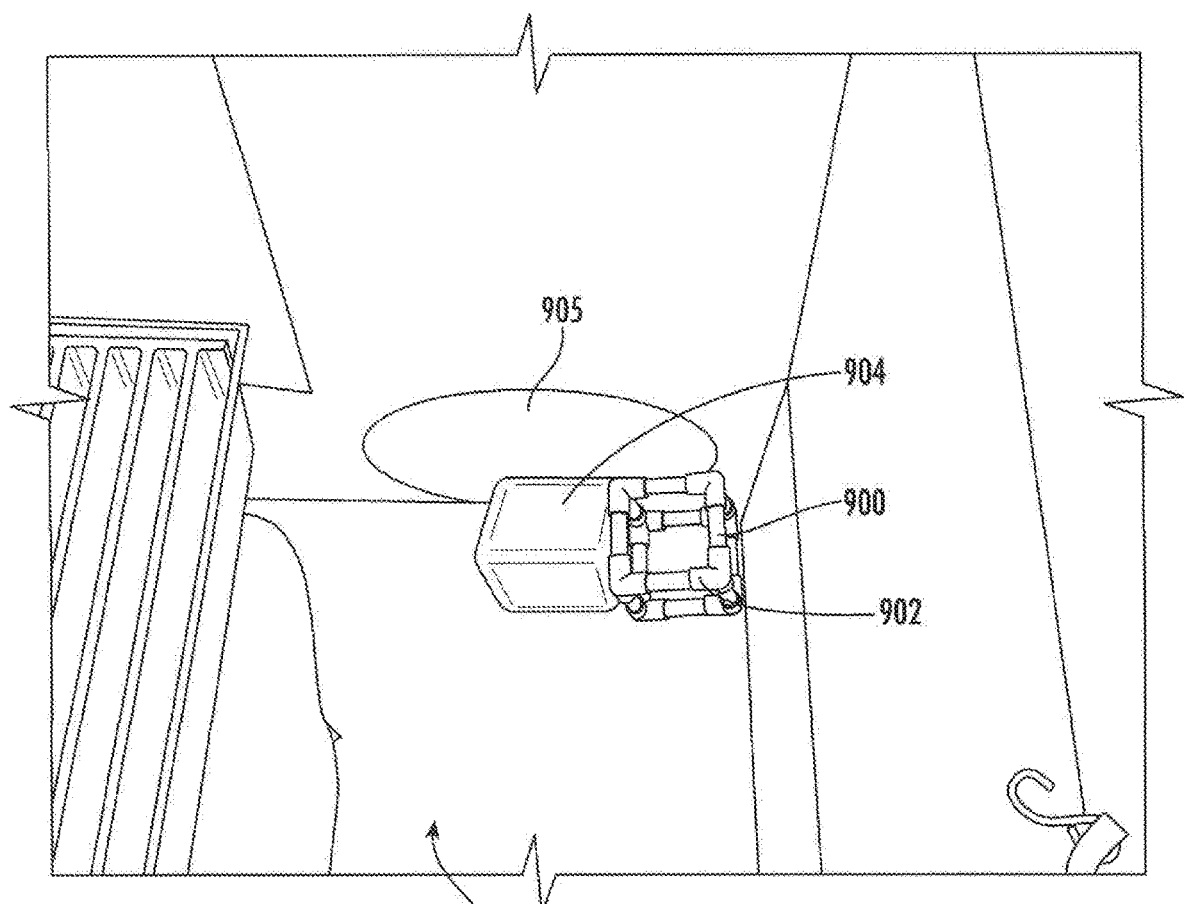
FIG. 18 is a perspective view showing a storm water runoff compact filter according to the present disclosure, placed at the bottom of a catch basin.
Figure 19A:
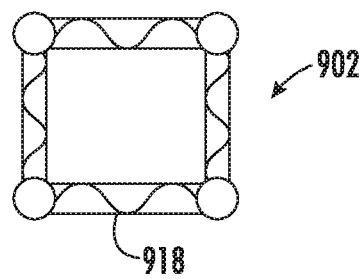
FIGS. 19A-D are sectional views of a various embodiments of a storm water runoff compact filter according to the present disclosure.
Figure 19B:
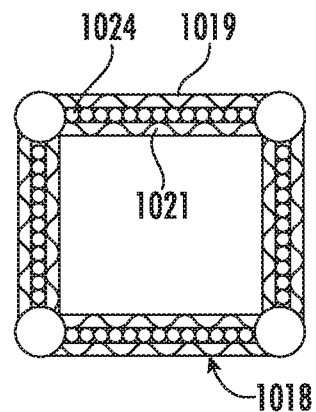
Figure 19C:
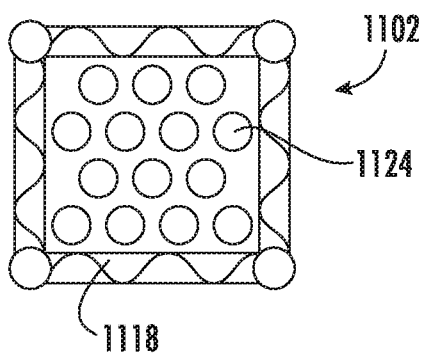
Figure 19D:
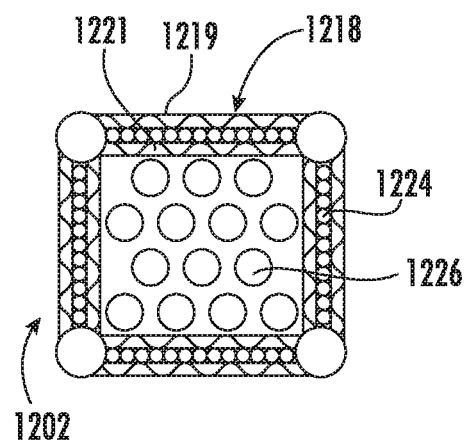

FIG. 18 shows a pair of compact drainage basin filters 900, 904 according to an alternate embodiment of the present disclosure, positioned in front of the outlet 905 from a drainage basin 906. The mesh covering of one of the compact drainage filters 900 has been removed to show the frame 902. The compact drainage basin filters 900 are similar in structure to the wattles of FIGS. 13-17, except for their more compact size. In this illustrated embodiment, the frame 902 is configured as a cube rather than an elongated triangle. In other embodiments, the frame may be triangular, spherical, cylindrical, hexagonal, or whatever compact geometric configuration is most suitable for a specific drainage basin. If the drainage outlet 905 is too large to be covered by a single compact drainage filter 900, several compact drainage filters 900 may be arranged side-by-side, or stacked upon each other, to filter contaminants from water passing out of the basin 906 through the outlet 905.

FIGS. 19A-D are cross-sectional views showing various embodiments of drainage basin cubes according to the present disclosure. In one embodiment, shown in FIG. 19A, the mesh material 918 comprises a single layer of woven or non-woven fabric, and the interior of the cube 502 is empty. In another embodiment, shown in FIG. 19B, the interior of the cube 1002 is again empty, but the mesh material 1018 comprises two layers 1019, 1021 of with a layer of woven or non-woven fabric, with a layer of filtration material such as biochar or activated carbon 1024 between the fabric layers 1019 and 621. In yet another embodiment, shown in FIG. 19C, the mesh material 1118 comprises a single layer of woven or non-woven fabric, and the interior of the cube 1102 is filled with filtration material such as biochar or activated carbon 1124. In still another embodiment, shown in FIG. 19D, the mesh material 1218 comprises two layers 1219, 1221 of with a layer of woven or non-woven fabric, with a layer of filtration material such as biochar or activated carbon 1224 between the fabric layers 1219 and 1221. The interior of the cube 1292 is filled with more filtration material 1226.

FIGS. 20A-D show stormwater runoff control devices according to the present disclosure installed in a catch basin 1300. FIG. 20A shows that a stormwater runoff control carpet may be placed over the grate 1316 above the basin 1300, as shown at 1302A, or below the grate 1316, as shown at 1302B. If positioned over the grate 1316, the transverse edges 1301, 1303 of the carpet are tucked down and clamped between the lateral edges of the grate 1316 and the upper edges of the inlet frame 1320. If positioned below the grate 1316, transverse edges 1301, 1303 are turned up and clamped between the lateral edges of the grate 1316 and the upper edges of the inlet frame 1320.

FIG. 20B shows that a stormwater runoff control carpet 1302 may be used in combination with compact drainage filters, such as drainage basin cubes 1304. The carpet 1302 may be placed above or below the inlet grate 1316 to filter out certain types of contaminants or sediment, and the compact drainage filters 1304, also known as drainage basin cubes, may be placed in front of the outlet to filter out contaminants or sediment that passes through the carpet 1302.

FIG. 20C shows that the transverse edges 1301, 1303 of the border portion of the carpet 1302 may be locked into place against the sides of the inlet frame 1320 by inserting boards 1305, 1307 between the outermost bars of the grate 1316 and the frame, and clamping the edges 1301, 1303 between the boards 1305, 1307 and the frame 1320.

FIG. 20D shows that the border portion 1330 of the carpet 1302 may extend beyond the edges 1331, 1333 of the grate 1316. If the border portion 1330 is made of sufficiently heavy material, its weight will hold down the carpet 1302 without the need for an attachment assembly.

Figure 21A:
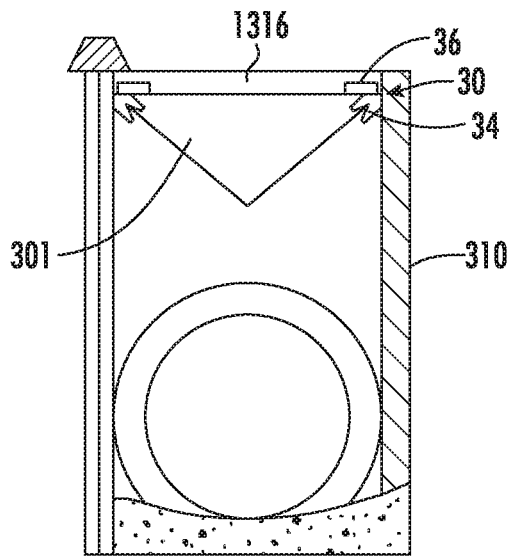
FIGS. 21A-D are views similar to FIGS. 20A-D, showing alternate arrangements of storm water runoff control devices in a catch basin.
Figure 21B:
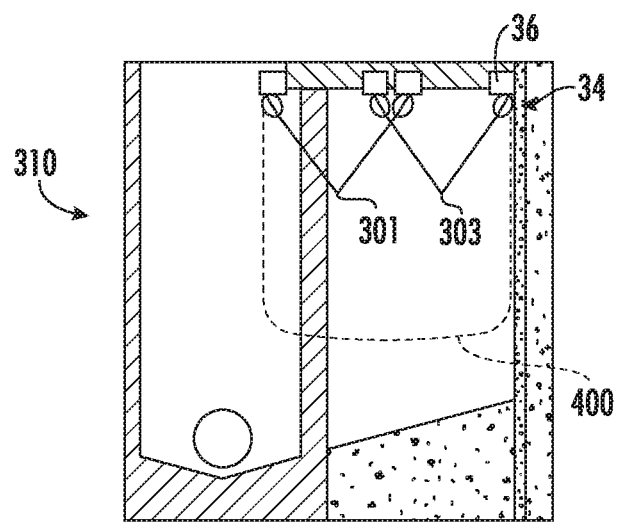
Figure 21C:
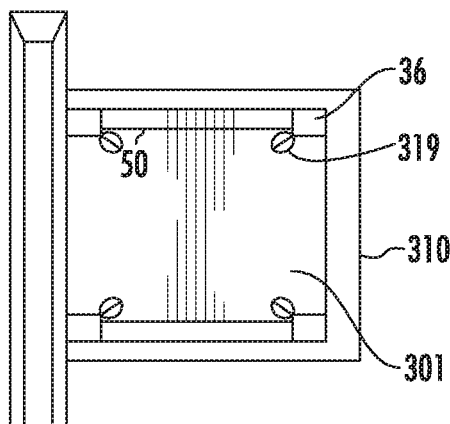
Figure 21D:
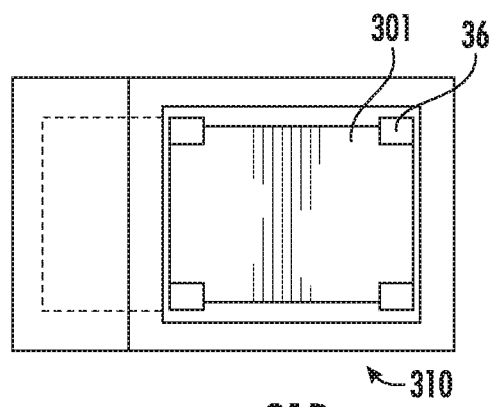
Figure 22A:
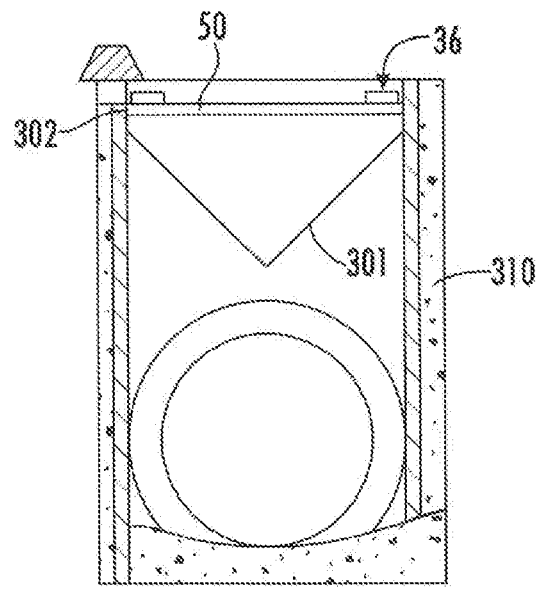
FIGS. 22A-D are views similar to FIGS. 20A-D, with more arrangements of storm water runoff control devices in a catch basin.
Figure 22B:
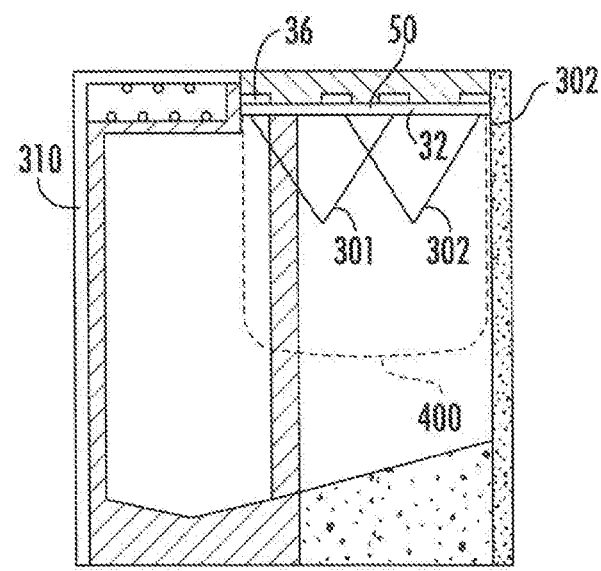
Figure 22C:
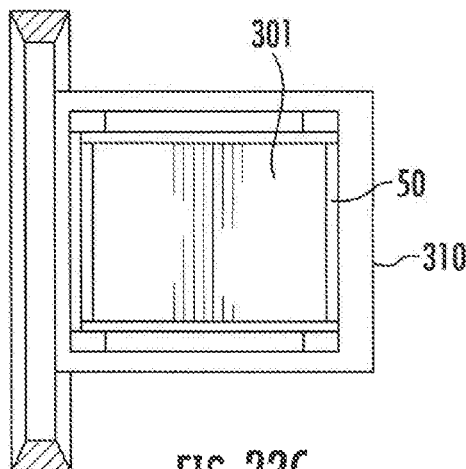
Figure 22D:
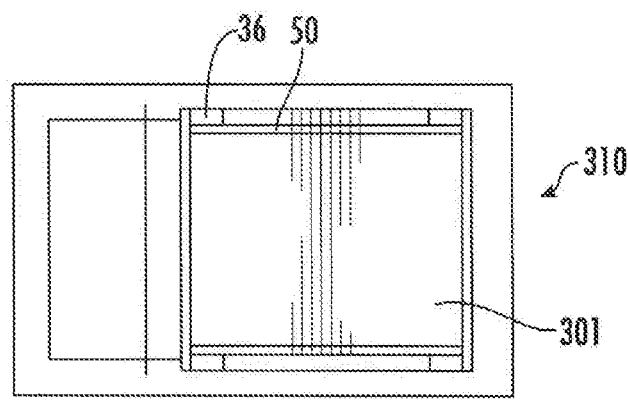

FIGS. 21A-D show alternate arrangements for controlling flow of stormwater runoff into and through the catch basin 1300. Instead of a carpet placed over the grate 316, a plurality of overlapping filtration sieves or nets 301, 302 may be suspended below the grate 316, as seen in FIGS. 21A and B. Alternatively, a stormwater runoff control basket 400 may be used, as shown in phantom in FIG. 21B. The filtration sieves or nets 301, 302, or the stormwater control basket 400 may be held in place using the same magnets 36 and clips 319 as mounted on horizontally extending grate support brackets 50 similar to those shown in FIGS. 11A and B.

FIGS. 22A-D show arrangements similar to those shown in FIGS. 21A-D, except that the clips 319 have been eliminated. Instead, the upper edges of the filtration sieves or nets 301, 304, or the stormwater control basket 400 are folded over the support brackets 50 and are held in place by the magnets 36.

Figure 23A:
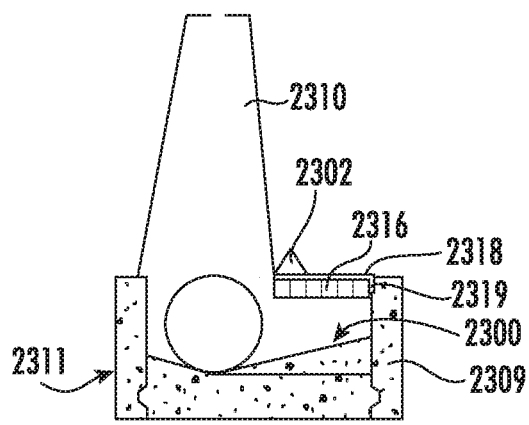
FIGS. 23A-E show various arrangements for using wattles, storm water runoff control carpets, and storm water control cubes according to the present disclosure to control flow in and out of a catch basin located below concrete barriers.
Figure 23B:
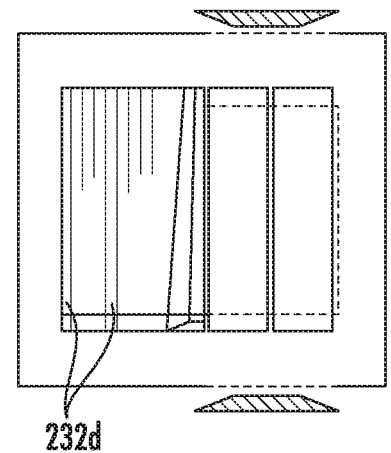
Figure 23C:
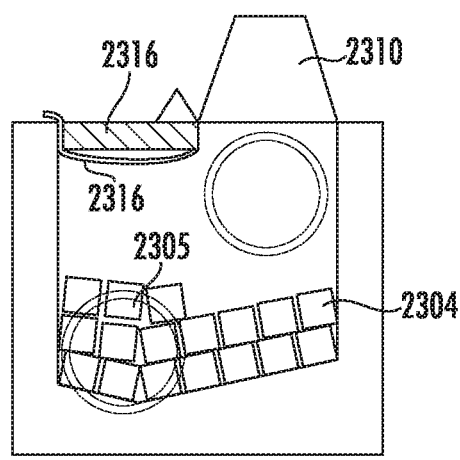

FIGS. 23A-C show a catch basin 2300 located beneath a concrete barrier 2310. A drainage grate 2316 positioned over the drainage inlet between one side of the barrier and one wall 2309 of the inlet frame 2311 prevents large debris from entering the catch basin 2300. A stormwater runoff control blanket 2318 is placed over the drainage grate 2316, and a storm water control wattle 2302 is wedged into an opening between the grate 2316 and the barrier 2310. The blanket is locked in place by clamping one edge 2319 between the edge of the grate 2316 and the wall 2309, as shown by in FIG. 23A, and by inserting elongated boards 2320 between the bars of the grate 2316, as shown in FIG. 2B. In an alternative arrangement, shown in FIG. 23C, the runoff control blanket 2318 is positioned under the drainage gate 316. In addition, a plurality of compact drainage filters, such as basin cubes 2304 are positioned in front of the drainage outlet 2305, to allow further removal of contaminants from water leaving the basin.

Figure 23D:
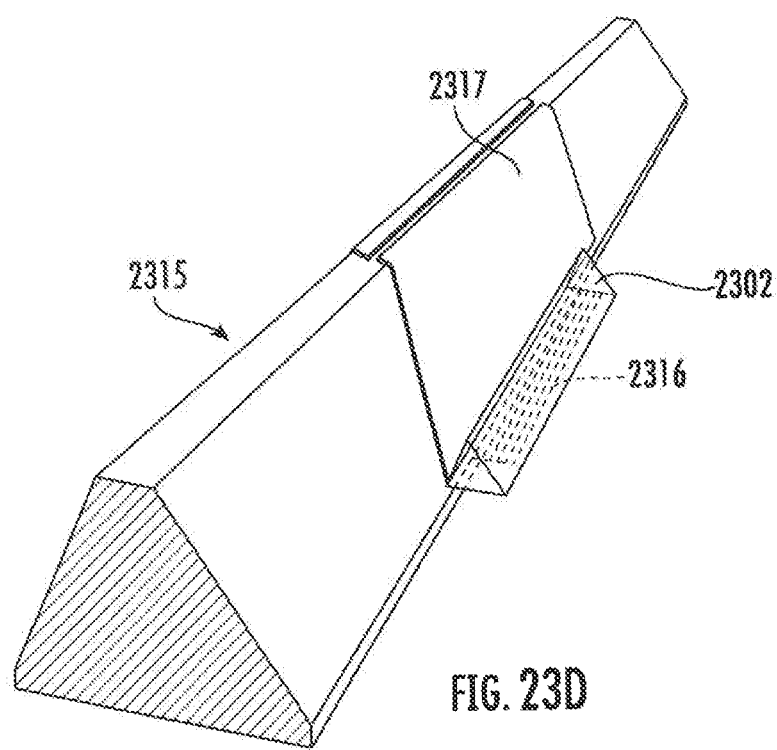

FIG. 23D shows a drainage basin underneath an elongated concrete barrier 2315, where a portion of the barrier 2315 directly above the drainage grate 2316 is covered by a steel plate 2317 that prevents erosion of the concrete. A wattle 2302 according to the present disclosure is wedged into the space between the bottom edge of the steel plate 2317 and the drainage grate 2316, to prevent debris and contaminants from entering the drainage inlet.

Figure 23E:
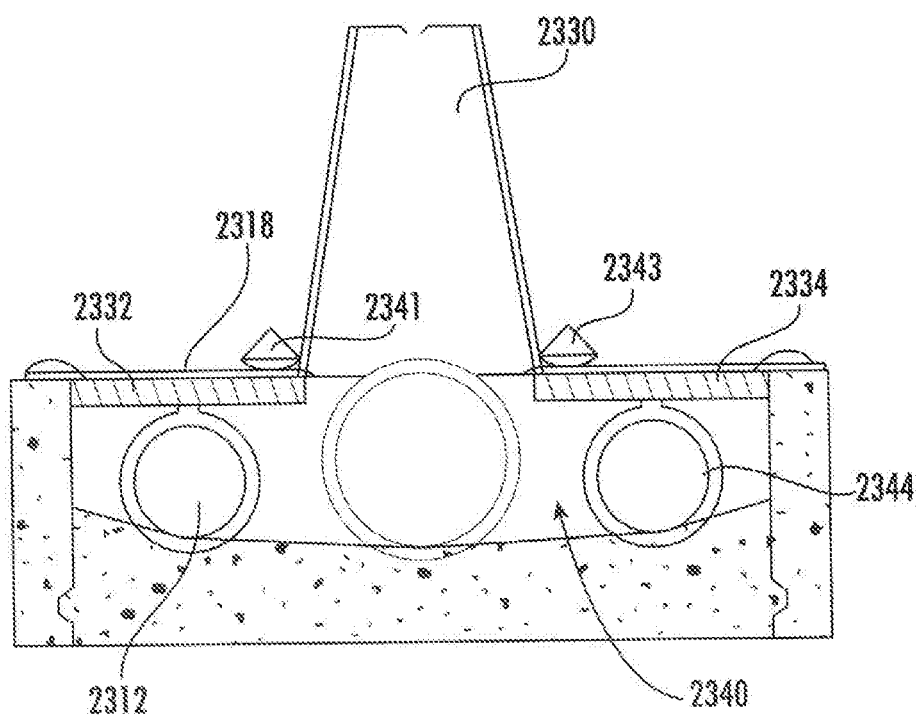

FIG. 23E shows a steel-plated concrete barrier 2330 located between two drainage grates 2332, 2334 over a catch basin 2340 containing slotted pipes 2342, 2344. Carpets 2318, 2319 over the 2332, 2334 remove debris and contaminants from storm water before it enters the catch basin 2340 and slotted pipes 2342, 2344. In addition, wattles 2341, 2343 are wedged into the spaces between the bottom edge of the steel-plated concrete barrier 2330 and the drainage grates 2332, 2334 to provide more filtration.

Figure 24A:
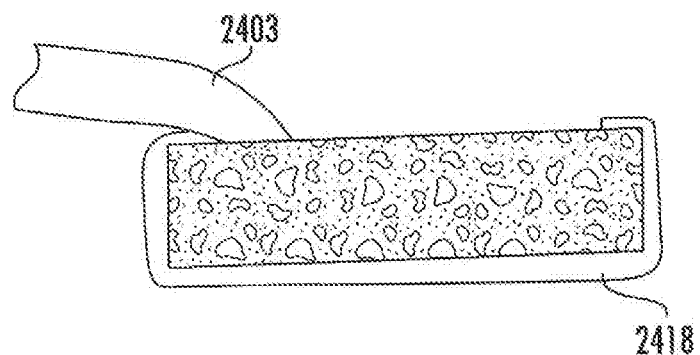
FIG. 24A is an elevation view of a rock slope protection site.
Figure 24B:
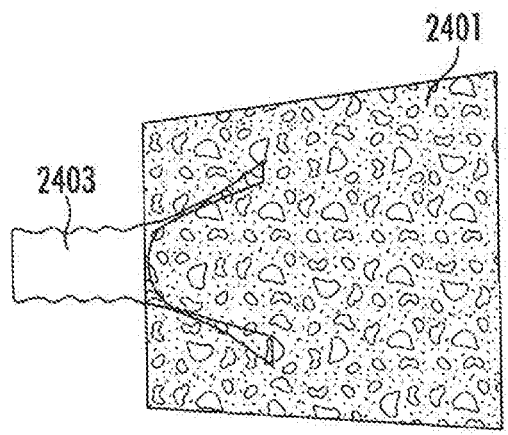
FIG. 24B is a plan view of FIG. 24A.

FIGS. 24A and B show a rock slope protection site 2401 formed at the outlet of a drainage pipe 2403. The rock slope protection site 2401 comprises a basin or hole that has been filled with rocks or stones ("riprap") to protect an environmentally sensitive area from erosion. A blanket 2418 according to the present disclosure is used to line the basin, to prevent contaminants from penetrating the soil below.

Figure 25A:
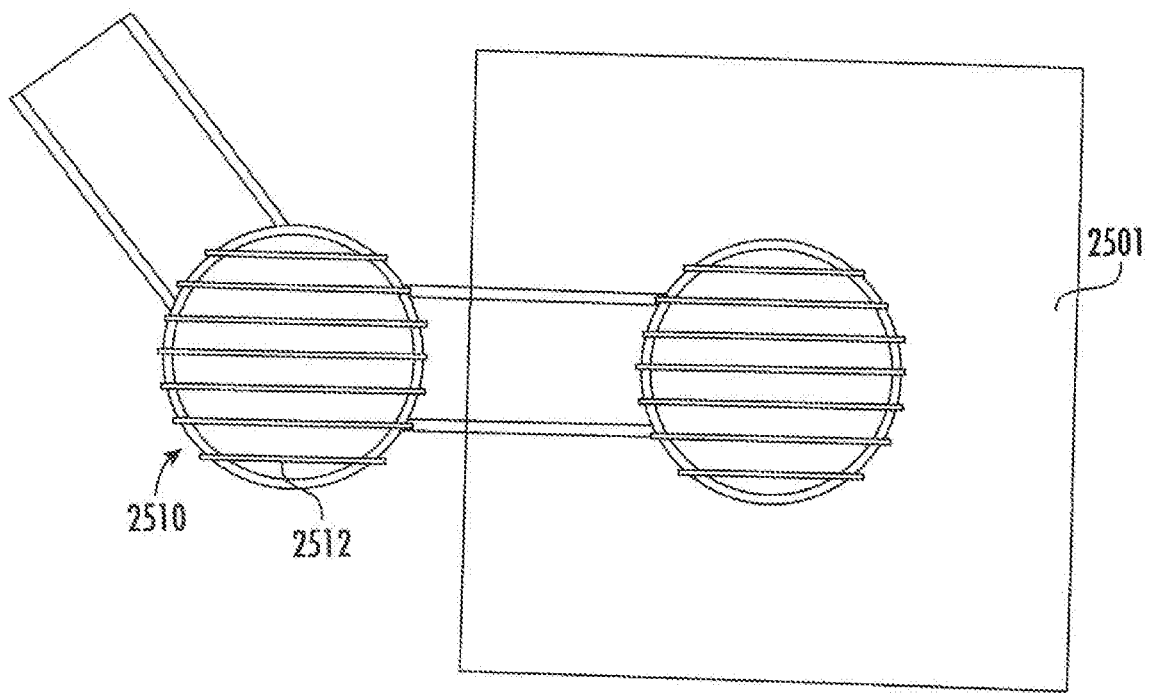
FIGS. 25A-C show an erosion and storm water runoff control carpet according to the present disclosure wrapped around a debris rack cage.
Figure 25B:
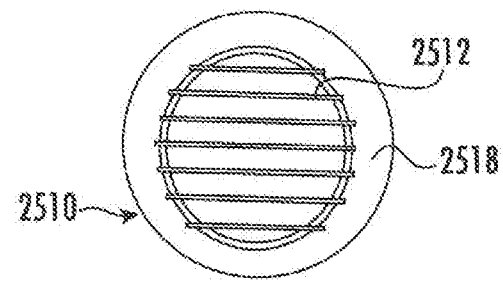
Figure 25C:
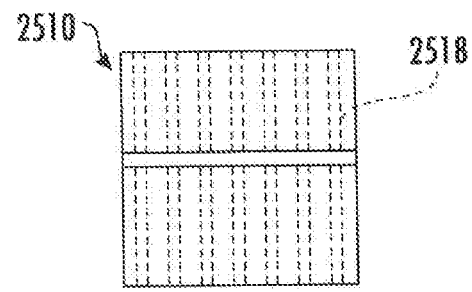

FIGS. 25A-C show a debris rack 2510 that may be placed at the inlet or outlet of a stormwater control structure 2501 to prevent the structure from become clogged. The debris rack 2510 comprises a cylindrical cage having a plurality of bars 2512, 2514 extending across its inlet opening and sides. The bars 2512 prevent large debris from entering or exiting the storm water control structure 2501. A blanket 2518 according to the present disclosure is wrapped around the cage, to prevent smaller debris and contaminants from entering or exiting the structure 2501.

Figure 26A:
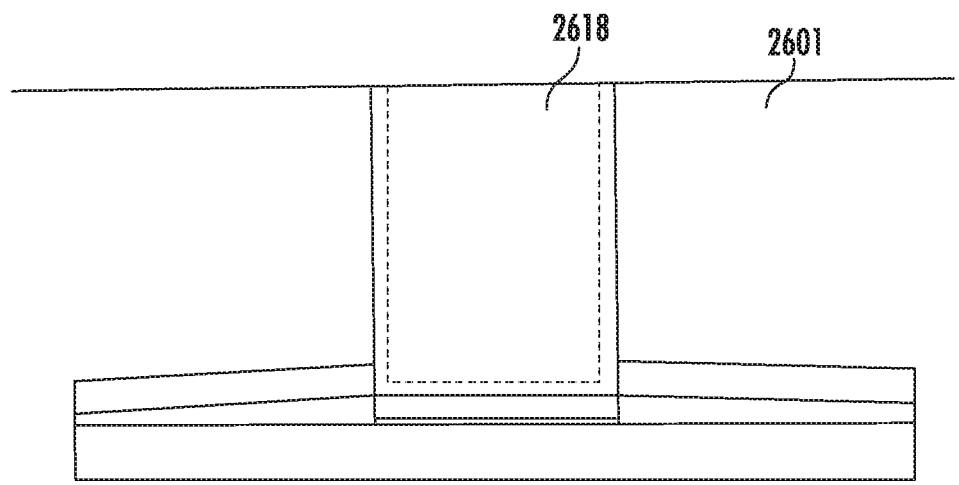
FIGS. 26A-B show an erosion and storm water runoff control apparatus according to the present disclosure used to control flow into a sidewalk culvert.
Figure 26B:
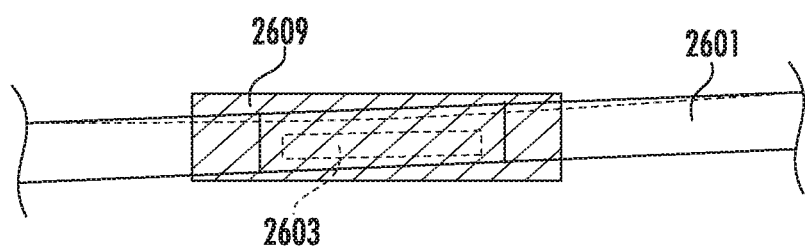

FIGS. 26A and B show a sidewalk 2601 having an upper inlet opening formed in its top surface and a side inlet opening 2603 formed in one side. The upper inlet opening is covered by a drainage grate, which in turn is covered by a blanket 2618 according to the present disclosure. The side inlet may be covered by a cylindrical wattle 2609, or it may be covered by another blanket 2618 which has been rolled into a solid cylinder.

Figure 27A:
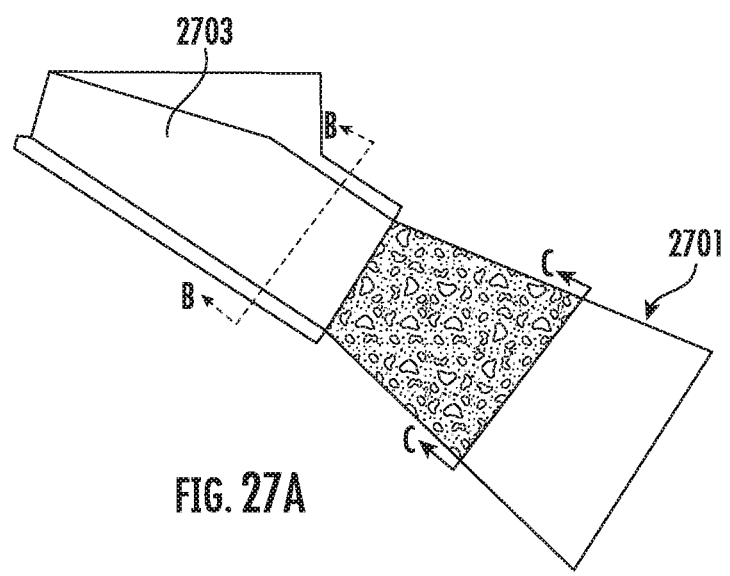
FIGS. 27A-C show an erosion and storm water runoff control blanket according to the present disclosure used in a bioswale with rock slope protection.
Figure 27B:
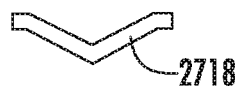
Figure 27C:
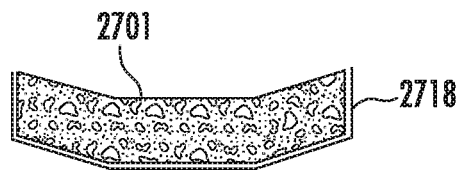

FIGS. 27A-C show a bioswale 2701 formed at the outlet of a drainage pipe 2703. The bioswale 2701 is a ditch or channel filled with rocks, stones, or riprap, similar to the rock slope protection site shown in FIGS. 24A and B. The channel is lined with a blanket 2718 according to the present disclosure, as shown in FIG. 27B, which is a sectional view taken through line B-B of FIG. 27A, and also shown in FIG. 27C, which is a sectional view taken through line C-C. Lining the channel in this way prevents contaminants from penetrating the soil below.

Figure 28:
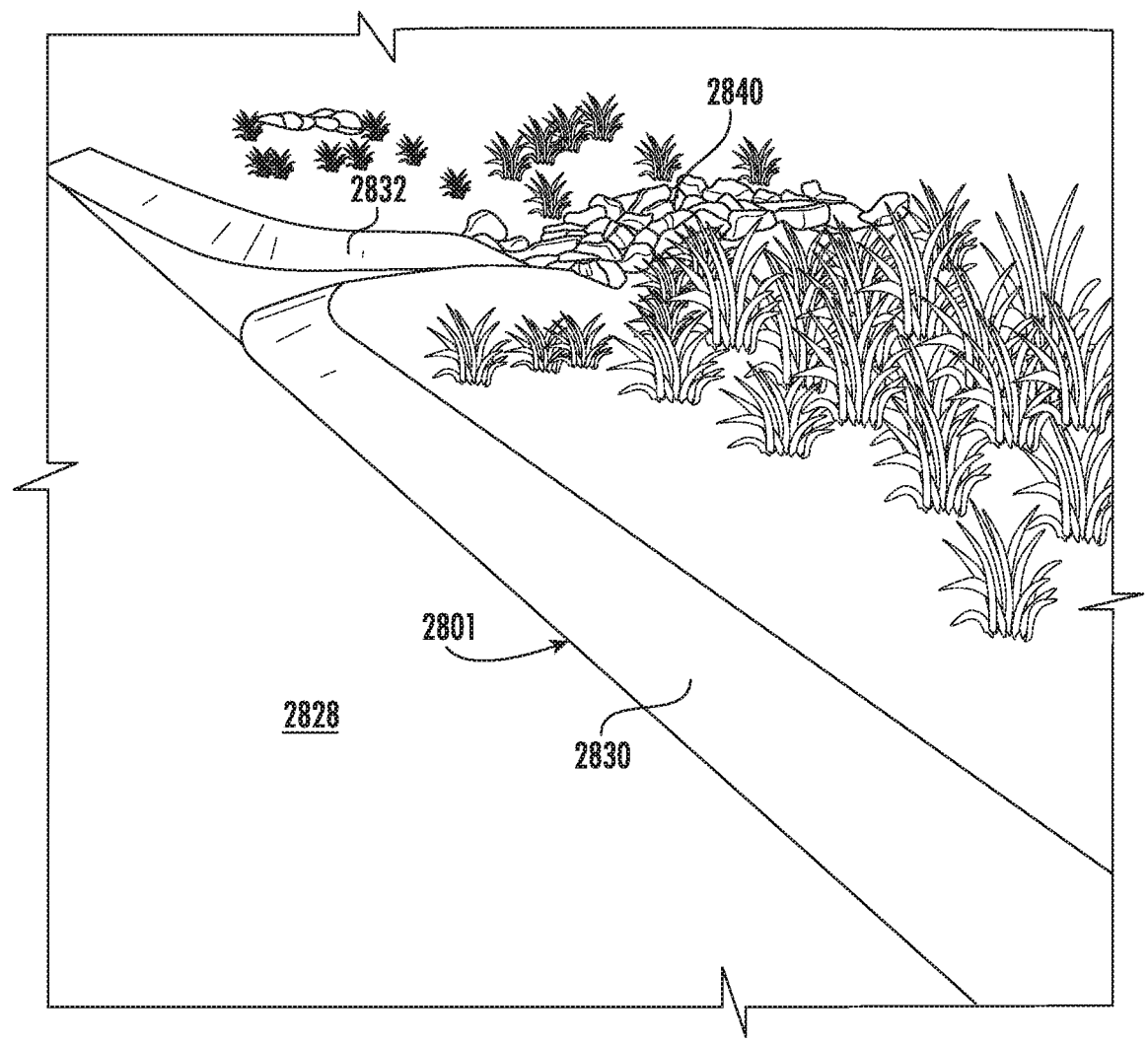
FIG. 28 shows how erosion and storm water runoff control carpets according to the present disclosure may be used to line a channel directing runoff from road shoulder to a bioswale.

FIG. 28 shows a channel 2801 that has been formed along the side of a highway 3028 to collect stormwater runoff. The channel 2801 includes a longitudinal portion 2830 that abuts and runs parallel to the highway 2828, and a lateral portion 2832 that intersects and extends generally perpendicular to the longitudinal portion 2830. Storm water that falls on the highway 2832 runs into the longitudinal portion 2830 of the channel 2801, and is then directed into the lateral portion 2832, which conducts the water into a bioswale 2840 with rock slope protection. The entire channel 2801, including both the longitudinal portion 2830 and the lateral portion 2830, as well as the bottom surface of the bioswale may be lined with a blanket according to the present disclosure, to prevent contaminants from penetrating the soil below.

Figure 29D:
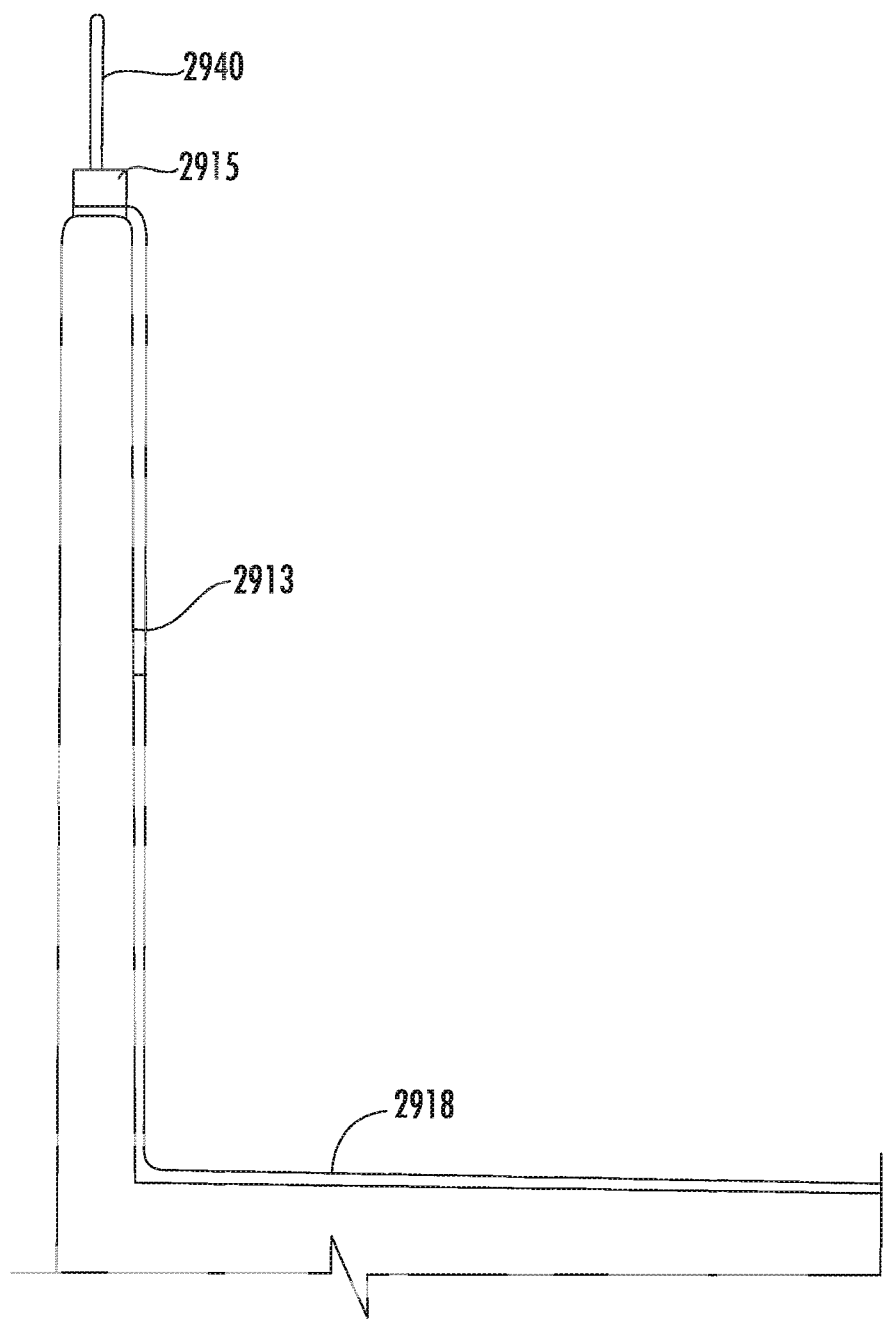
FIGS. 29A-D show an erosion and storm water runoff control blanket according to the present disclosure in an inclined screen gross solids removal vault.
Figure 29E:
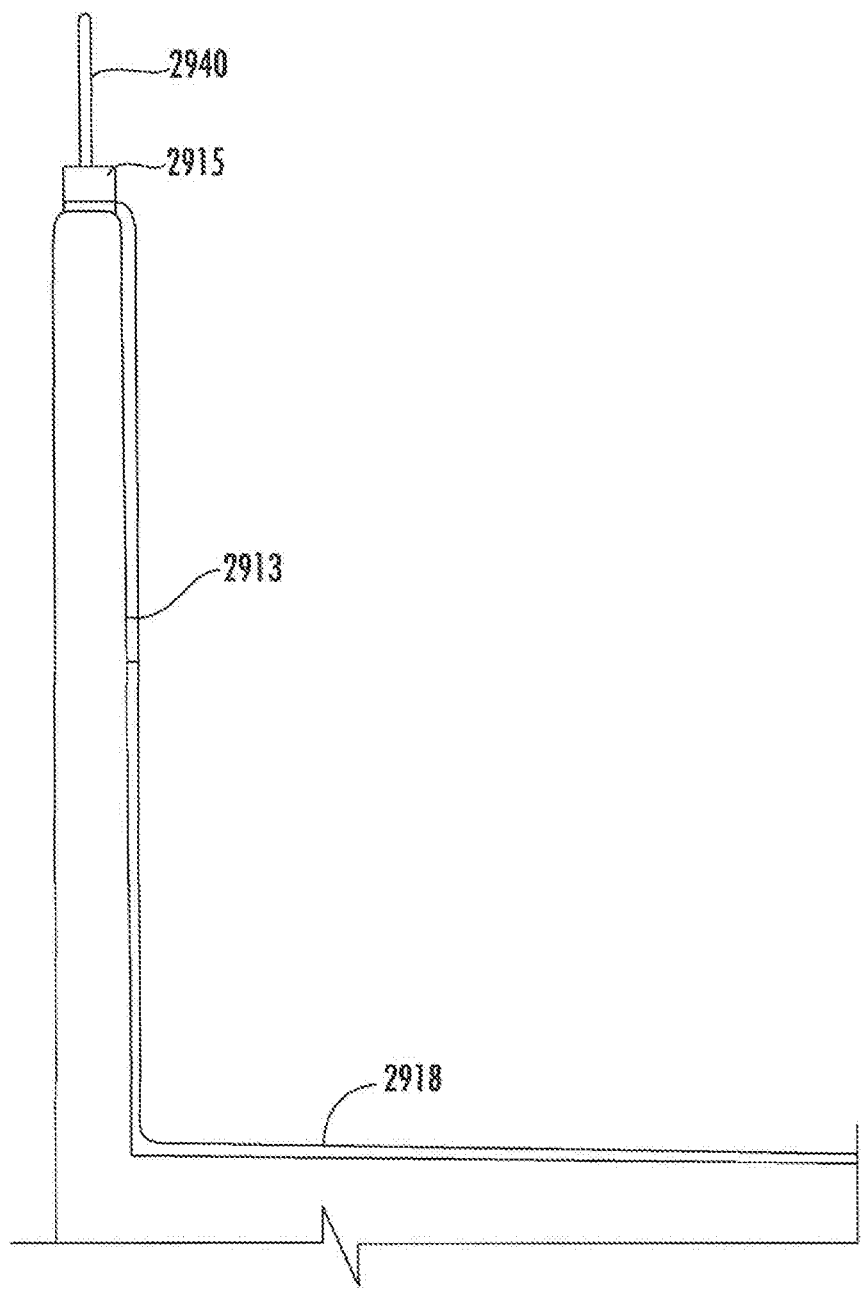

FIGS. 29A-D show a vault 2901 containing an inclined screen gross solids removal device (GSRD) 2905. An inlet pipe 2907 carries unfiltered stormwater into the vault 2901, and empties the unfiltered stormwater onto an energy dissipating slab 2909 and onto an inclined screen 2911, which filters out large debris. The floor and walls of the vault 2901 beneath the inlet pipe are lined with a blanket 2918 according to the present disclosure. As best seen in FIG. 29D, the blanket may be held in place by straps 2913 that are secured to an upper edge of the blanket and secured to an anchor 2915 secured to a wall of the vault 2901, or to the posts 2940 that support the railings 2942 of an observation platform at the top of the vault 2901.

Figure 30A:
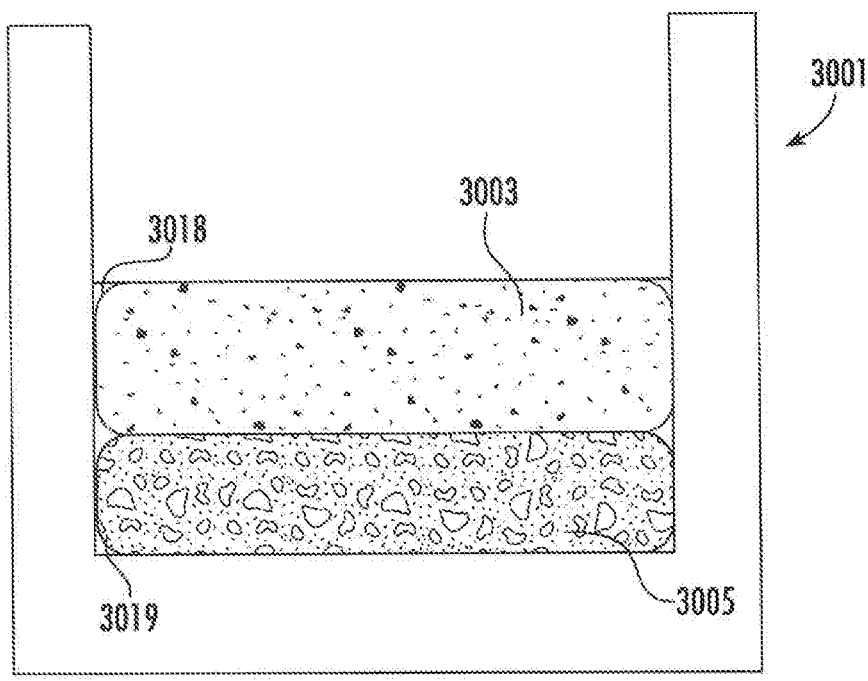
FIG. 30 shows an erosion and storm water runoff control carpet according to the present disclosure in a filtration basin.
Figure 30B:
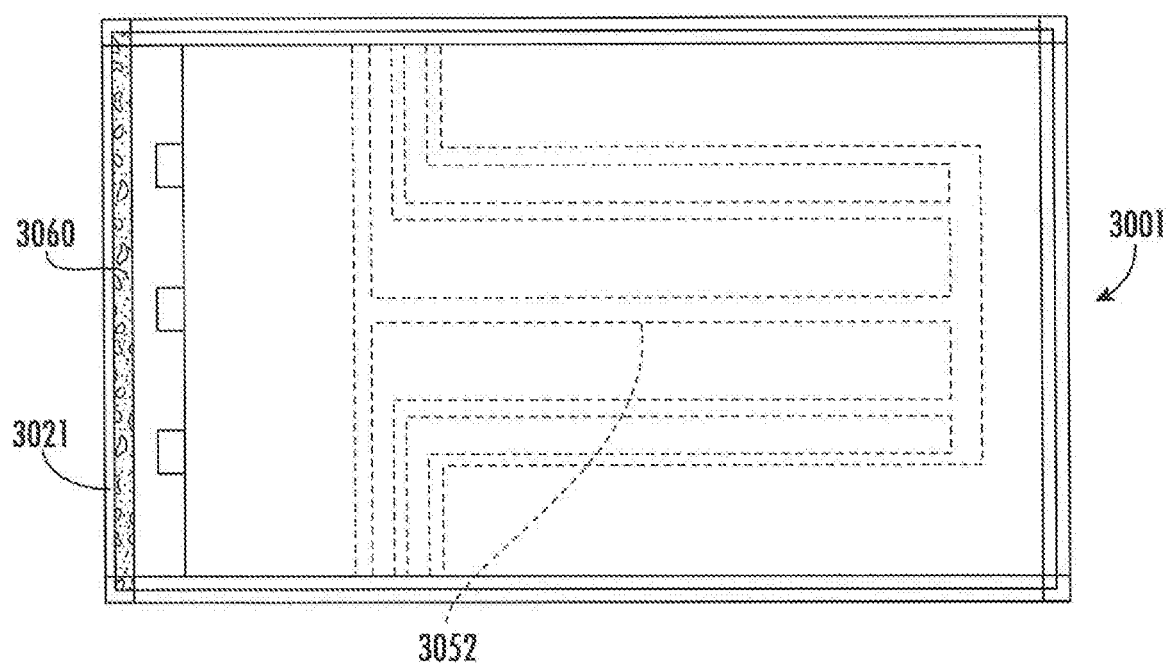

FIGS. 30A and B show a stormwater filtration basin 3001 that is separated from a sedimentation basin (not shown) by a gabion 3060. The basin 3001 contains an upper layer 3003 filled with a first filtering medium such as sand, and a lower layer 3005 filled with a second filtering material such as gravel. The upper layer 3003 is entirely encased in, or wrapped with, a first blanket 3018 according the present disclosure, and the lower layer is entirely encased in, or wrapped with, a second blanket 3019 according the present disclosure. The top surface and wall of the gabion 3060 are encased or wrapped in a third blanket 3021 according to the present disclosure. The blankets around each component of the filtration basin provide three extra stages of filtration before the storm water reaches the underdrain piping 3052.

The above uses for the stormwater runoff and erosion control devices of the present disclosure are not intended to be limiting, but are just examples of the multitude of ways in which storm water control carpets or blankets, wattles (also called dimensional tubes), and compact drainage filters according to the present disclosure may be used in combination with retaining walls, bioswales, concrete barriers, gross solids removal devices (GSRDs), filtering vaults, gabions, drainage inlet filters, and other Best Management Practices to prevent erosion and minimize contamination of watersheds due to stormwater runoff.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A storm water runoff control device comprising:
   a mesh portion formed of a first fabric, the mesh portion having a perimeter;
   a border formed of a second fabric different from the first fabric, the border extending outwardly beyond the perimeter of the mesh portion to form an enlarged rim;
   a reinforcement bar or rod contained with a pocket in the enlarged rim; and
   an attachment assembly configured to secure the device below a drainage grate, the attachment assembly including
      an angle bracket having a horizontal portion and a vertical portion, and
      a clip having
         a hinged end coupled to the vertical portion of the angle bracket, and
         a grasping end configured to grasp the border.

2. The storm water runoff control device according to claim 1, wherein the first fabric comprises a geotextile.

3. The storm water runoff control device according to claim 1, wherein the mesh portion comprises:
   a first sheet formed of the first fabric;
   a second sheet formed of the first fabric; and
   a layer of biomass material sandwiched between the first and second sheets.

4. The storm water runoff control device according to claim 1, wherein the mesh portion comprises a plurality of discrete cells, each cell including:
   a filling formed of biomass material; and
   a fabric mesh material encasing the filling.

5. The storm water runoff control device according to claim 1, wherein the attachment assembly includes a magnetic element coupled to the mounting bracket.

6. A storm water runoff control device configured to control fluid flowing through a storm drain including a drainage grate supported by a storm drain frame, the device comprising:
   a sheet of mesh material formed of a first material;
   a border extending along the mesh material, wherein the border is formed of a second material different from the first material; and
   an attachment assembly configured to secure the device below the drainage grate, the attachment assembly including a clip having
      a hinged end configured to be coupled to the storm drain frame,
      a grasping end configured to grasp the border, and
      an angle bracket including a horizontal portion configured to be secured to a grate support flange projecting horizontally inwardly from the storm drain frame, and a vertical portion secured to the hinged end of the clip.

7. The storm water runoff control device according to claim 6, further comprising a magnetic element securing the horizontal portion of the angle bracket to the grate support flange.

8. A storm water runoff control device configured to control fluid flowing through a storm drain including a drainage grate supported by a storm drain frame, the device comprising:

a sheet of mesh material formed into a concave configuration including an upper edge;

a bottom; and elongated sides extending upwardly from the bottom to the upper edge; and an attachment assembly configured to secure the device below the drainage grate, the attachment assembly including a clip having a hinged end, and a grasping end configured to grasp upper edge; and a magnet configured to secure the hinged end of the clip to the storm drain frame.

9. A storm water runoff control device configured to control fluid flowing through a storm drain including a drainage grate supported by a storm drain frame having a metallic wall, the device comprising:

a sheet of mesh material formed of a first material;

a border extending along the mesh material, wherein the border is formed of a second material different from the first material; and an attachment assembly configured to secure the device below the drainage grate, the attachment assembly including a clip having a hinged end configured to be coupled to the storm drain frame, a grasping end configured to grasp the border, and a magnetic element secured to the hinged end of the clip.

* * * * *